United States Patent
Toprak-Deniz et al.

(10) Patent No.: US 11,153,129 B1
(45) Date of Patent: Oct. 19, 2021

(54) FEEDFORWARD EQUALIZER WITH PROGRAMMABLE ROAMING TAPS

(71) Applicant: International Business Machines Corporation, Armonk, NY (US)

(72) Inventors: Zeynep Toprak-Deniz, Norwalk, CT (US); John Francis Bulzacchelli, Somers, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/889,171

(22) Filed: Jun. 1, 2020

(51) Int. Cl.
*H04L 25/03* (2006.01)
*H04L 27/01* (2006.01)
*H04L 25/49* (2006.01)

(52) U.S. Cl.
CPC .. *H04L 25/03044* (2013.01); *H04L 25/03343* (2013.01); *H04L 25/4906* (2013.01); *H04L 27/01* (2013.01); *H04L 2025/0349* (2013.01)

(58) Field of Classification Search
None
See application file for complete search history.

(56) References Cited

U.S. PATENT DOCUMENTS

| | | | | |
|---|---|---|---|---|
| 2,233,667 A | * | 3/1941 | Krum | H04L 19/00 178/32 |
| 2,467,812 A | * | 4/1949 | Clapp | H05G 1/36 378/56 |
| 4,415,872 A | * | 11/1983 | Karabinis | H04B 7/005 333/166 |
| 4,899,366 A | * | 2/1990 | Davis | H04L 7/0058 333/18 |
| 5,896,067 A | * | 4/1999 | Williams | H03L 7/14 331/17 |
| 6,078,614 A | * | 6/2000 | Brown | G11B 5/0086 360/65 |
| 6,169,638 B1 | * | 1/2001 | Morling | G11B 5/035 330/254 |

(Continued)

FOREIGN PATENT DOCUMENTS

FR 2799085 A1 * 3/2001 ....... G11B 20/10037

OTHER PUBLICATIONS

M. Bichan et al, A 6.5 Gbs transmitter and Equalizer with variable tap spacing, IEEE, Nov. 2008 (Year: 2008).*

(Continued)

*Primary Examiner* — Berhanu Tadese
(74) *Attorney, Agent, or Firm* — Scully, Scott, Murphy & Presser, P.C.; Daniel P. Morris

(57) ABSTRACT

A transmitter (TX)-side feedforward equalizer (FFE) includes one or more "roaming" filter taps which can be used to compensate reflections that occur at unpredictable and substantial time offsets from a main pulse. The roaming filter taps are realized in a hardware- and power-efficient manner by implementing a programmable delay serializer in which the phases of multi-rate clocks are switched to introduce binary weighted delays on the roaming tap. In this way a variable difference in latencies is introduced between the main and the roaming tap data paths. The TX-side FFE implementations provide a fully programmable roaming tap generator having a 1-Unit Interval (UI) resolution of delay setting integrated into the data serializer of the TX macro.

20 Claims, 12 Drawing Sheets

(56) References Cited

U.S. PATENT DOCUMENTS

| | | | | |
|---|---|---|---|---|
| 6,650,699 B1* | 11/2003 | Tierno | H03L 7/091 | 375/232 |
| 7,197,053 B1* | 3/2007 | Liu | H04J 3/047 | 370/503 |
| 8,989,254 B2* | 3/2015 | Jing | G06F 13/102 | 375/233 |
| 9,025,656 B1* | 5/2015 | Raman | H04L 25/03146 | 375/233 |
| 9,106,462 B1* | 8/2015 | Aziz | H04L 25/03057 | |
| 9,143,371 B1* | 9/2015 | Warner | H04L 25/08 | |
| 9,215,104 B1* | 12/2015 | Vita | H04L 25/03057 | |
| 9,337,934 B1* | 5/2016 | Agazzi | H04L 7/0075 | |
| 9,337,993 B1* | 5/2016 | Lugthart | H04L 7/0054 | |
| 9,942,028 B1* | 4/2018 | Dickson | H03M 9/00 | |
| 9,942,030 B1* | 4/2018 | Dickson | H04L 7/0058 | |
| 10,243,762 B1* | 3/2019 | Kadkol | H03K 5/135 | |
| 10,257,121 B1* | 4/2019 | Qin | H04L 25/00 | |
| 10,298,420 B1* | 5/2019 | Chada | H04L 25/03343 | |
| 10,447,254 B1* | 10/2019 | Kadkol | H04B 3/14 | |
| 10,447,510 B1* | 10/2019 | Rengarajan | H04L 27/06 | |
| 10,466,301 B1* | 11/2019 | Lee | G01R 31/3171 | |
| 10,681,802 B1* | 6/2020 | Beukema | H04L 25/0272 | |
| 10,848,352 B1* | 11/2020 | Rathor | H04L 25/03121 | |
| 2002/0141347 A1* | 10/2002 | Harp | H04N 5/21 | 370/248 |
| 2004/0091041 A1* | 5/2004 | Shanbhag | H04L 25/0307 | 375/234 |
| 2004/0114542 A1* | 6/2004 | Stapler | H04M 9/082 | 370/286 |
| 2004/0122607 A1* | 6/2004 | Fishman | H04B 10/07 | 702/69 |
| 2004/0240539 A1* | 12/2004 | Shanbhag | H04L 25/0307 | 375/233 |
| 2004/0258183 A1* | 12/2004 | Popescu | H03H 15/00 | 375/350 |
| 2005/0052255 A1* | 3/2005 | Chiang | H01P 3/085 | 333/18 |
| 2005/0152479 A1* | 7/2005 | Bulow | H04L 25/03057 | 375/341 |
| 2005/0190832 A1* | 9/2005 | Ibragimov | H04L 25/03057 | 375/233 |
| 2007/0092018 A1* | 4/2007 | Fonseka | H04L 1/0054 | 375/265 |
| 2007/0140296 A1* | 6/2007 | Koppelaar | H04B 14/026 | 370/470 |
| 2007/0253477 A1* | 11/2007 | Abel | H04L 25/062 | 375/233 |
| 2008/0080608 A1* | 4/2008 | Mobin | H04L 25/03057 | 375/233 |
| 2008/0080609 A1* | 4/2008 | Mobin | H04L 25/03057 | 375/233 |
| 2009/0224806 A1* | 9/2009 | Huang | H04L 7/0062 | 327/72 |
| 2009/0252212 A1* | 10/2009 | Risk | H04L 25/03343 | 375/231 |
| 2010/0329319 A1* | 12/2010 | Dai | G01R 31/3171 | 375/224 |
| 2011/0142120 A1* | 6/2011 | Liu | H04L 25/03057 | 375/233 |
| 2012/0147944 A1* | 6/2012 | Amirkhany | H03K 19/017581 | 375/232 |
| 2012/0166505 A1* | 6/2012 | Hogeboom | G06F 5/16 | 708/301 |
| 2012/0187980 A1* | 7/2012 | Kurahashi | H03K 19/018514 | 326/86 |
| 2012/0201289 A1* | 8/2012 | Abdalla | H04L 25/03057 | 375/233 |
| 2013/0208779 A1* | 8/2013 | Agrawal | H03K 5/135 | 375/232 |
| 2013/0230092 A1* | 9/2013 | Prokop | H04L 25/03044 | 375/233 |
| 2013/0230093 A1* | 9/2013 | Aziz | H04L 25/14 | 375/233 |
| 2014/0079111 A1* | 3/2014 | Hui | H04L 25/03044 | 375/234 |
| 2015/0009740 A1* | 1/2015 | Stephens, Jr. | G11C 7/106 | 365/63 |
| 2015/0349988 A1* | 12/2015 | Annampedu | H04L 25/03019 | 375/231 |
| 2016/0006596 A1* | 1/2016 | Dickson | H04L 27/01 | 375/298 |
| 2016/0094295 A1* | 3/2016 | Doany | H04B 10/2507 | 398/193 |
| 2017/0317686 A1* | 11/2017 | Dartois | H03F 3/19 |
| 2019/0305851 A1* | 10/2019 | Vegas-Olmos | H04B 10/541 |
| 2019/0342127 A1* | 11/2019 | Zerbe | H04B 1/1081 |
| 2019/0356346 A1* | 11/2019 | Kawasaki | H04B 1/62 |
| 2019/0356388 A1* | 11/2019 | Campos | H04B 10/2572 |
| 2019/0383873 A1* | 12/2019 | Hojabri | G01R 31/3167 |
| 2020/0084074 A1* | 3/2020 | Toprak-Deniz | H04L 27/0002 |
| 2020/0106649 A1* | 4/2020 | Peng | H03F 3/45237 |
| 2020/0252248 A1* | 8/2020 | Palusa | H04L 25/03878 |

OTHER PUBLICATIONS

Jung et al., "A Floating Tap Termination Scheme with Inverted DBI AC and Floating Tap Forcing Technique for High-Speed Low-Power Signaling", 2017 Symposium on VLSI Circuits digest of technical papers : Jun. 5-8, 2017, IEEE 2017, 2 pages.

Zhong et al., "A 1.0625 14.025 Gb/s Multi-Media Transceiver With Full-Rate Source-Series-Terminated Transmit Driver and Floating-Tap Decision-Feedback Equalizer in 40 nm CMOS", IEEE Journal of Solid-State Circuits, vol. 46, No. 12, Dec. 2011, pp. 3126-3139.

Bulzaccelli, "A Superconducting Bandpass Delta-Sigma Modulator for Direct Analog-to-Digital Conversion of Microwave Radio", Department of Electrical Engineering and Computer Science, Massachusetts Institute of Technology, Jun. 2003, 305 pages.

Zerbe et al. "Equalization and Clock Recovery for a 2.5-10-Gb/s 2-PAM/4-PAM Backplane Transceiver Cell", IEEE Journal of Solid-State Circuits, vol. 38, No. 12, Dec. 2003, pp. 2121-2130.

Bulzaccelli, "Equalization for Electrical Links", IEEE Solid-State Circuits Magazine, Dec. 2, 2015, pp. 23-31.

Aziz et al., "Shift Register Multi-Phase Clock Based Downsampled Floating Tap DFE for Serial Links", Conference: 2014 IEEE International Symposium on Circuits and Systems (ISCAS), Jun. 2014, pp. 2469-2472.

Bulzaccelli, "Superconducting Bandpass ΔΣ Modulator With 2.23-GHz Center Frequency and 42.6-GHz Sampling Rate", IEEE Journal of Solid-State Circuits, vol. 37, No. 12, Dec. 2002, pp. 1695-1702.

* cited by examiner

| SEL<2:0> | C4SEL<1:0> | Relative Introduced Delay [UI] |
|---|---|---|
| 0 | 0 | 0 |
|  | 1 | 1 |
|  | 2 | 2 |
|  | 3 | 3 |
| 1 | 0 | 4 |
|  | 1 | 5 |
|  | 2 | 6 |
|  | 3 | 7 |
| ... | ... | ... |
| 7 | 0 | 28 |
|  | 1 | 29 |
|  | 2 | 30 |
|  | 3 | 31 |

FIG. 9

5-bit programmable delay serializer with performing bit swaps on the incoming data

FEEDFORWARD EQUALIZER WITH PROGRAMMABLE ROAMING TAPS

BACKGROUND

The present disclosure relates to improvements in transmitter circuits for transmitting signals, e.g., over a conductive communications channel or link, and particularly to an improved feedforward equalizer for improving transmitter signal data rates (throughput) over a conductive wire channel with reduced bit error rates.

Copper wires have been used as electrical channels for wireline systems. These channels consist of some combination of bond wires, package traces, printed circuit board (PCB) traces, connectors, and cables. These components introduce frequency-dependent attenuation as a result of skin effect and dielectric losses. Without compensating for such distortion, the maximum data rate of a typical electrical link would be limited to only a few Gb/s to avoid excessive intersymbol interference (ISI). One key to achieving dramatically higher data rates (e.g., up to 56 Gbaud in the latest proposed standards) is to employ channel equalization. Recently published transceivers operating at these data rates use a combination of transmitter (TX)-side feed-forward equalizer (FFE), receiver (RX)-side continuous-time linear equalizer (CTLE), and/or decision-feedback equalizer (DFE).

In some implementations the RX includes an analog-to-digital converter (ADC) and some of the equalization such as FFE or DFE is implemented in the digital domain. Specific types of equalization may be required for compensating channel imperfections such as reflections from impedance discontinuities. Previously DFE has been shown to be effective in dealing with reflections from impedance discontinuities, provided that postcursor ISI due to reflections falls within the time span of the DFE. To make efficient use of limited hardware resources, some RX-side DFEs employ "roaming" (or "floating") taps, which can be reallocated to different delay times where the largest reflections are found.

BRIEF SUMMARY

In an aspect of the present disclosure, there is provided an efficient and effective transmitter (TX)-side feed-forward equalizer (FFE) device with roaming (or floating) taps.

Further to this aspect, the TX-side FFE implementation provides a fully programmable data serializer structure that efficiently implements a variable, tunable delay of a roaming tap to allow the use of different tap spacings at different bit rates.

Further to this aspect, the TX-side FFE implementation provides for clock phase switching into the programmable delay serializer structure such that a relative latency between two output data streams can be varied in 1-Unit Interval (UI) resolution increments.

According to one embodiment, there is provided a transmit-side feedforward equalizer. The transmit-side feedforward equalizer comprises: a first data serializer circuit comprising a first plurality of pipeline connected re-timer and multiplexor circuit stages operable for serializing input digital data bits received in parallel at a first re-timer and multiplexor stage of the first plurality operable to reduce the number of parallel digital bits output at each respective successive stage in accordance with a respective received different binary frequency scaled clock signal, a binary frequency scaled clock signal being a scaled sub-multiple of an input clock signal;

a second data serializer circuit operating in parallel with the first data serializer circuit and comprising a second plurality of pipeline connected re-timer and multiplexor circuit stages in one-to-one correspondence with the first plurality of pipeline connected re-timer and multiplexor circuit stages, the second data serializer circuit operable for serializing the input digital data bits received in parallel at a first re-timer and multiplexor circuit stage, the second data serializer providing a second data output delayed in time according to a programmed latency with respect to an output of the first data serializer circuit; and a plurality of programmable switching devices in one-to-one correspondence with the second plurality of pipeline connected re-timer and multiplexor stages, each respective programmable switching device receiving a respective different binary frequency scaled sub-multiple clock signal or its complement binary frequency scaled sub-multiple clock signal, the plurality of programmable switching devices being programmed to select an output of one of: a binary frequency scaled sub-multiple clock signal or its complement binary frequency scaled sub-multiple clock signal for receipt at its corresponding re-timer and multiplexor stage of the second plurality to program the time delay of the second data serializer circuit output.

According to a further embodiment, there is provided a method of operating a transmit-side feedforward equalizer. The method comprises: serializing input digital data bits received in parallel at a first re-timer and multiplexor circuit stage of a first data serializer circuit comprising a first plurality of pipeline connected re-timer and multiplexor circuit stages, each successive re-timer and multiplexor stage of the first plurality reducing the number of parallel digital bits output at each respective successive stage in accordance with a respective received different binary frequency scaled clock signal, a binary frequency scaled clock signal being a scaled sub-multiple of an input clock signal; serializing the input digital data bits received in parallel at a first re-timer and multiplexor circuit stage of a second data serializer circuit in parallel with the first data serializer circuit, the second data serializer circuit comprising a second plurality of pipeline connected re-timer and multiplexor circuit stages in one-to-one correspondence with the first plurality of pipeline connected re-timer and multiplexor circuit stages, the second data serializer providing a second data output delayed in time according to a programmed latency with respect to an output of the first data serializer circuit; and programming a time delay latency of the second data output of the second data serializer circuit using a plurality of programmable switching devices in one-to-one correspondence with the second plurality of pipeline connected re-timer and multiplexor stages, each respective programmable switching device receiving a respective different binary frequency scaled clock signal or its complement binary frequency scaled clock signal, each of the plurality of programmable switching devices programmed to select an output of one of: a binary frequency scaled clock signal or its complement binary frequency scaled clock signal for receipt at its corresponding re-timer and multiplexor stage of the second plurality, wherein the programmed time delay latency of the second data serializer circuit output relative to the first data serializer circuit output is one of: k unit intervals when the input clock signal is a full rate clock signal, or k=jN when the input clock signal is 1/N rate of the full rate clock signal, a unit interval corresponding to a duration of time of a pulse or symbol in an output data stream, and where k, j are whole numbers and N is a positive integer.

In further aspects of the present disclosure, apparatus, systems and methods in accordance with the above aspect may also be provided. Any of the above aspects may be combined without departing from the scope of the present disclosure.

BRIEF DESCRIPTION OF THE DRAWINGS

The details of the present disclosure, both as to its structure and operation, can be understood by referring to the accompanying drawings, in which like reference numbers and designations refer to like elements.

FIG. 9 is a table depicting all of the selection code to delay relationships and illustrating how the delay can be programmed from 0 UI to 31 UI, in increments of 1 UI;

DETAILED DESCRIPTION

The present disclosure relates to an improved transmit-side feedforward equalizer (FFE) by providing an FFE with a programmable roaming tap generator integrated into the data serializer.

Figure 1B:
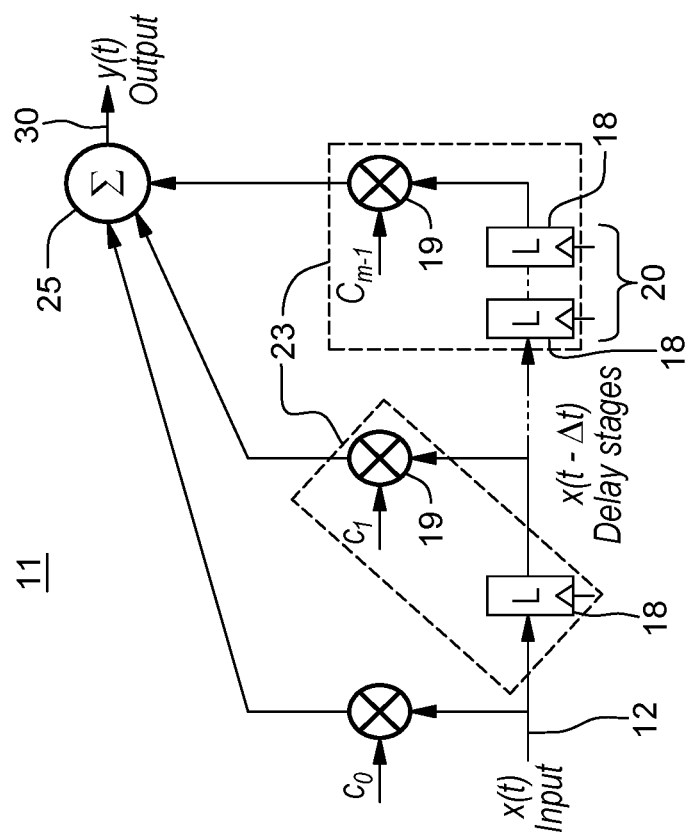
FIG. 1B presents a block diagram of an m-tap TX-side FFE showing the delay stages implemented with digital latches.
Figure 1A:
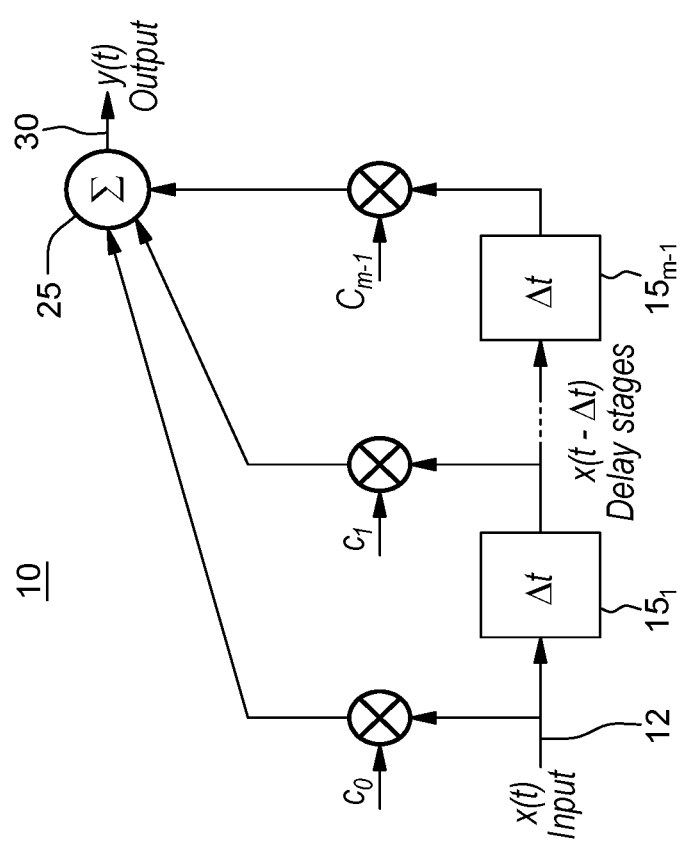
FIG. 1A presents a block diagram of an m-tap FFE showing an input signal being fed through multiple delay stages.

FIG. 1A presents a block diagram of an m-tap FFE 10 showing an input signal 12 being fed through multiple delay stages $15_1, \ldots, 15_{m-1}$. The input signal 12 is linearly multiplied with a weighted tap coefficient $c_0$, and each of the respective delay stage outputs is multiplied with a respective weighted tap coefficient ($c_1, \ldots, c_{m-1}$) to generate respective FFE tap signals. In an embodiment, FFE taps are selected to generate a filter with the inverse transfer function of the communications channel carrying the signal, e.g., printed circuit board (PCB) conductors, connectors, cables, etc. As shown in FIG. 1A, each resulting FFE weighted tap signal (the product of a delay stage output and a tap coefficient) at each stage is combined (added together) by summation element 25 and output to the communications channel conductor as output signal 30.

In the case of a TX-side FFE, where the data input x(t) 12 is known binary data, the delay stages $15_1, \ldots, 15_{m-1}$ are implemented with digital latches 18 such as shown in the block diagram of an m-tap FFE 11 depicted in FIG. 1B. In an implementation, Δt is chosen to be one unit interval (UI). A unit interval is defined as the time duration of each pulse or symbol in a data stream (e.g., in the case of NRZ data transmission, the unit interval equals the time duration of each bit). While FIG. 1B shows the latches being clocked at full rate, other implementations may use half-rate or quarter-rate clocking. Taps or tap weighting circuits 23 that include a latch(es) 18 and an associated adaptive coefficient weighting circuit 19 with larger latencies (e.g., 32 UIs) can be realized by adding latches 18 to form long shift registers 20, but the extra stages of latches are very power hungry at these high data rates and consume additional chip area.

Figure 2:
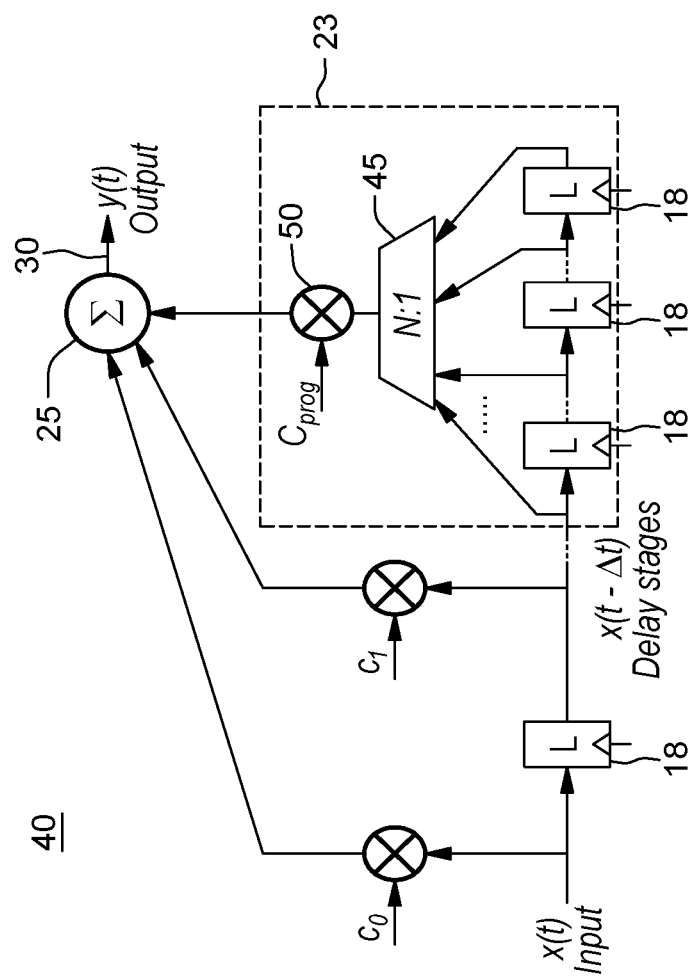
FIG. 2 depicts an embodiment of an m-tap FFE wherein a delay of a tap is programmable by adding an N:1 data selection multiplexer (MUX) to a tap of the FFE circuit shown in FIG. 1B.

In an embodiment of an m-tap FFE 40 depicted in FIG. 2, the delay of a tap circuit 23 is made programmable by adding an N:1 data selection multiplexer (MUX) 45 to the m-tap FFE circuit 11 of FIG. 1B. In this embodiment, the tap coefficient is programmable, i.e., $c_{prog}$, and would be adapted to different values depending upon the data selected via the MUX 45. However, for different data rates and channels, reflections (due to impedance discontinuities) could occur at various time offsets, e.g. 0 to 63 UI, from the main tap which would require fully programmable delay setting of a given roaming tap with preferably 1 UI resolution. For example, given very high data rates, e.g., for 56 Gbaud, 1 unit interval of resolution is about 17.9 picoseconds (ps) and for a data rate of 100 Gbaud, 1 UI is 10 ps. Implementing long delays with 1 UI resolution with the architecture of FIG. 2 is costly in terms of power and hardware.

In an embodiment, to compensate for reflections that occur at unpredictable and substantial time offsets from the main pulse, a transmitter (TX)-side feedforward equalizer (FFE) with one or more "roaming" filter taps is used. The roaming filter taps are realized in a hardware- and power-efficient manner by implementing a serializer in which the phases of multi-rate clocks are switched to introduce binary weighted delays on the roaming tap. In this way a variable difference in latencies is introduced between the main and the roaming tap data paths.

In the TX-side FFE, there is configured a fully programmable roaming tap generator integrated into the data serializer of the TX macro. The usage of the multi-rate aspect of the serializer introduces binary weighted delays on the roaming tap. Longer delays are generated by switching the clock phases of the lower clock frequency multiplexing stages of the serializer, while shorter delays are introduced by switching the clocks of the higher clock frequency multiplexing stages. This enables high flexibility in the tap delay setting with minimal overhead.

In the embodiment, the TX-side FFE circuitry with one or more "roaming" filter taps is able to tune longer delays while utilizing the existing hardware of the serializer with minimal extra circuitry and harnesses the availability of the binarily scaled clock frequencies resulting in a very power and hardware efficient implementation. Extending the covered number of UIs is straightforward at the cost of minimal additional hardware. As a result, a roaming tap can be generated where the reflections occur to maximize the equalization capability. Addition of more than one roaming tap is also straightforward by replicating the hardware dedicated to generating the roaming tap.

Figure 3:
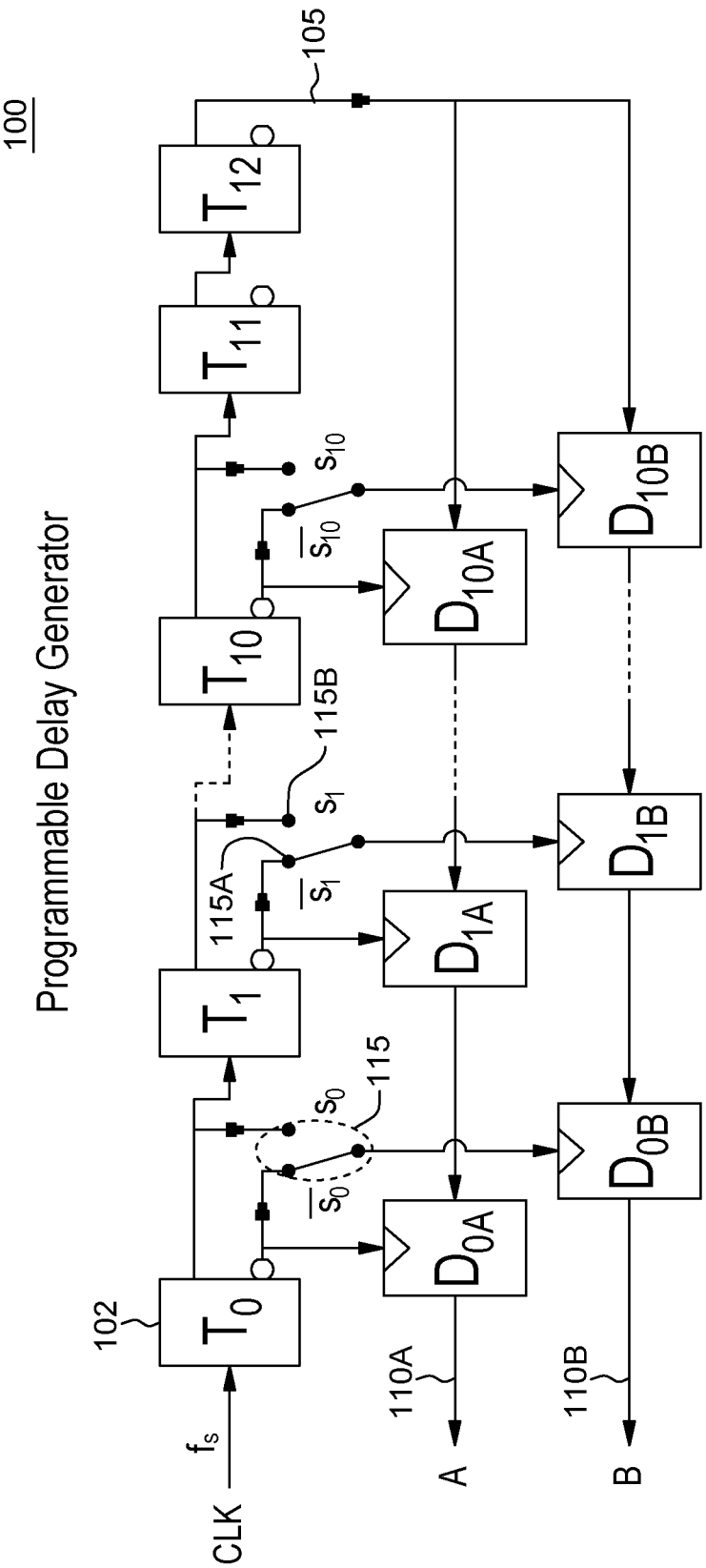
FIG. 3 depicts a circuit diagram of a counter with programmable latency introduced on one of its outputs for producing a variable delay by means of clock phase selection.

FIG. 3 depicts a circuit diagram of a programmable delay generator 100 for producing a variable delay by means of clock phase selection. In particular, the programmable delay generator 100 of FIG. 3 is a counter with programmable latency introduced between outputs labeled output A and output B. In the circuit 100 depicted in FIG. 3, there is provided a series connection of toggle circuits 102 (e.g., $T_n$, where n=0, 1, . . . , 12), each toggle circuit ($T_n$) 102 being a divide-by-2 toggle flip-flop circuit. The series connection of toggle circuits $T_n$ forms a simple ripple counter wherein only the first divide-by-2 toggle flip-flop receives an external clock and all subsequent divide-by-2 toggle flip-flops are clocked by the output of the preceding flip-flop. In the embodiment shown, the output 105 of the final divide-by-2 toggle flip-flop is fed back along two rows, i.e. top (A) and bottom (B) rows, of D latches. Top row A receives ripple counter feedback signal 105 at serial connected D latches $D_{10A}$, . . . $D_{1A}$, $D_{0A}$, to provide a fixed delay. Bottom row B receives ripple counter feedback signal 105 at serial connected D latches $D_{10B}$, . . . , $D_{1B}$, $D_{0B}$, to provide a variable delay. A programmable relative delay between the output 110A of the fixed delay row (top row A) and the output 110B of the variable delay row (bottom row B) is provided with respective switch circuitry 115 (e.g., $S_n$, where n=0, 1, . . . , 10) provided at the output of each divide-by-2 toggle 102 for switching the clocking of the bottom row latches. In the embodiment of programmable counter 100 depicted in FIG. 3, at the output of each respective toggle $T_0$, $T_1$, $T_{10}$ is a respective switch $S_0$-$S_{10}$ that are controlled by an 11-bit control word (not shown). When all of the switches are programmed in the $\overline{S}_n$ position 115A, the pipelining latency along the bottom row B matches that of the upper row, and the A and B output pulses are generated on the same cycle of clock (CLK). Moving some of the switches to the $S_n$ position 115B increases the pipelining latency along the bottom row, and the B output 110B is delayed relative to the A output 110A. For instance, moving switch $S_0$ from the $\overline{S}_0$ to $S_0$ position increases the pipelining latency by one clock (CLK) cycle. Moving switch $S_1$ from $\overline{S}_1$ to $S_1$ position increases the pipelining latency by two CLK cycles. More generally, moving switch $S_k$ from the $\overline{S}_k$ to $S_k$ position increases the pipelining latency by $2^k$ CLK cycles, so the relative delay (in periods of CLK) between the outputs A and B equals the 11-bit code given by $S_0$-$S_{10}$. Assuming the programmable delay generator is clocked at full-rate (C1), the latency introduced between the A and B outputs can be varied from 0 to 2047 UIs, in increments of 1 UI.

Figure 4:
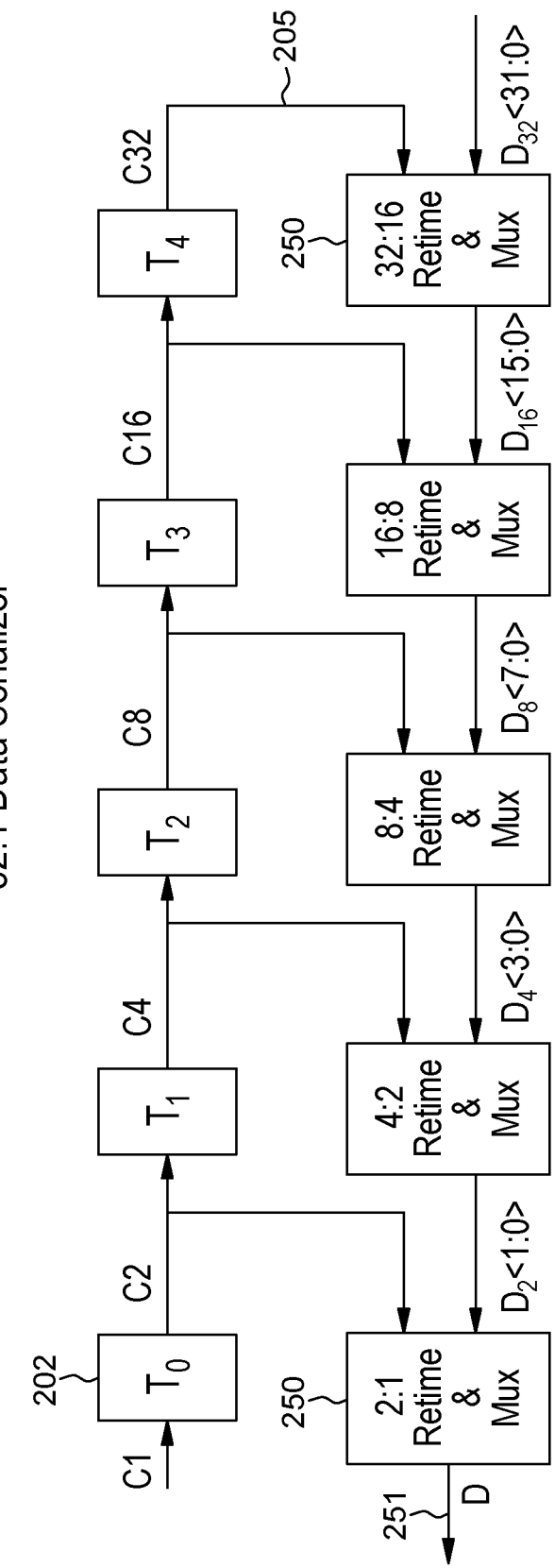
FIG. 4 depicts a circuit diagram of a data serializer employing a counter formed from serial connection of toggle circuits, where each toggle circuit divides the input clock (C1) frequency binarily, i.e., by a factor of two.

FIG. 4 depicts a circuit diagram of a data serializer 200 that similarly employs a ripple counter formed from toggle flip-flops 202, where each toggle flip-flop 202 divides the input clock (C1) frequency by a factor of two (i.e., a 2:1 frequency divider). In the embodiment depicted in FIG. 4, a 32:1 data serializer is implemented by employing a ripple counter having five serial connected 2:1 frequency dividing toggle flip-flops (e.g., toggle circuits $T_p$, where p=0, 1, . . . , 4), each successive frequency dividing toggle flip-flop 202 generating the half-rate (C2), quarter-rate (C4), eighth-rate (C8), sixteenth-rate (C16), and thirty-second-rate (C32) clocks needed to operate the different pipeline connected retiming and MUX stages 250 that receive and output the data D. For example, output clock C32 of the last toggle flip-flop $T_4$ is input to clock operations at a 32:16 retiming and MUX stage, output clock C16 of the toggle flip-flop $T_3$ is input to clock operations at a 16:8 retiming and MUX stage, output clock C8 of the toggle flip-flop $T_2$ is input to clock operations at a 8:4 retiming and MUX stage, output clock C4 of the toggle flip-flop $T_1$ is input to clock operations at a 4:2 retiming and MUX stage, and the output clock C2 of the toggle flip-flop $T_0$ is input to clock operations at a 2:1 retiming and MUX stage 250 for doubling the input data rate at each stage.

Figure 5:
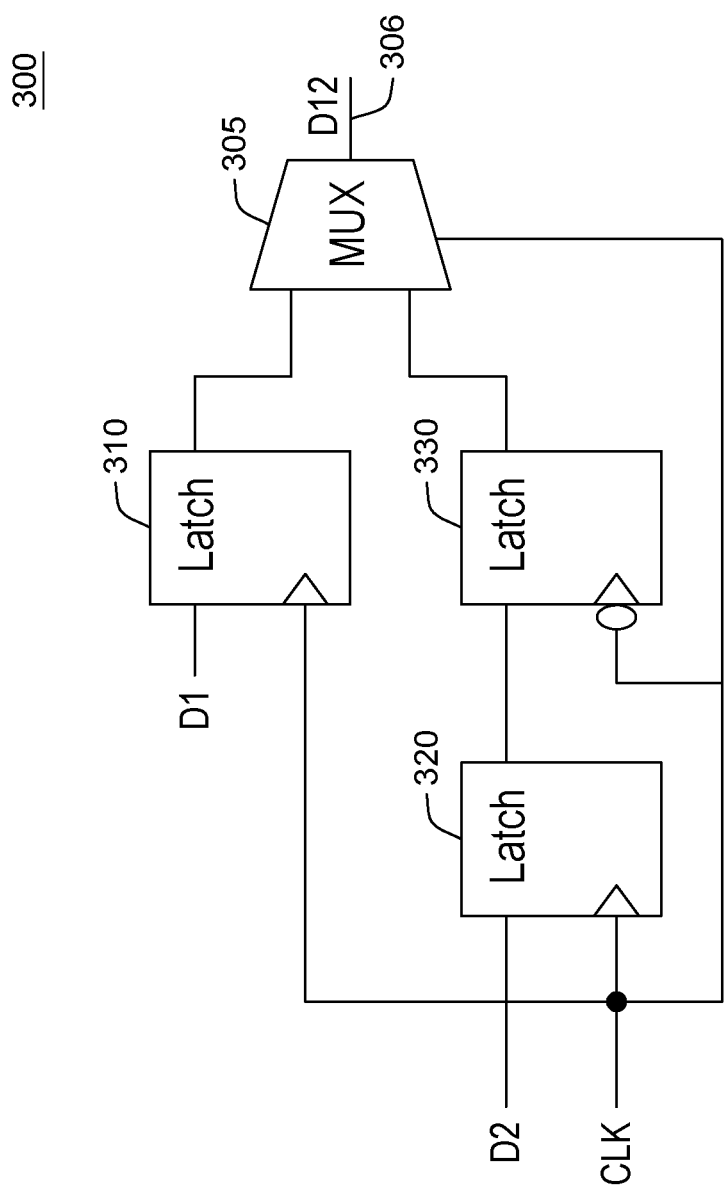
FIG. 5 depicts a circuit diagram of a retiming and MUX stage used in an example 32:1 serializer shown in FIG. 4.

FIG. 5 depicts a circuit diagram of a retiming and MUX stage 300 used in the 32:1 serializer 200 of FIG. 4. As each stage of MUXing doubles the data rate, the number of parallel data lines is reduced by a factor of two after each stage. For example, an exemplary retiming and MUX stage 300 shown in FIG. 5 receives two data lines D1, D2 and the MUX 305 outputs a single data line. In particular, a first latch circuit, e.g., a flip-flop 310, receives and forwards received data D1 upon the rising edge of CLK, and a second latch circuit 320 receives and forwards received data D2 upon the rising edge of CLK. However, the output of the second latch 320 is input to a third latch 330 which delays the output of D2 until the next falling edge of CLK, providing extra delay. The MUX circuit 305 multiplexes both D1 and D2 (extra delayed) as a single output D12, with the MUX selection timed by the clock CLK, thereby doubling the output data rate while reducing the data input lines from two to a single line 306. Thus, returning to FIG. 4, since each stage of MUXing doubles the data rate, the number of parallel data lines is reduced by a factor of two after each stage (from $D_{32}$<31:0> to $D_{16}$<15:0>, from $D_{16}$<15:0> to $D_8$<7:0>, etc.). For example, the 32:16 retiming and MUX stage 250 receives data $D_{32}$<31:0> and based on received clock C32 outputs the data at double the data rate in half the number of data lines, i.e., a reduced number of lines $D_{16}$<15:0>. Similarly, the 16:8 retiming and MUX stage receives data $D_{16}$<15:0> and based on received clock C16, outputs the data at double the data rate on a one-half reduced number of lines $D_8$<7:0>. Similarly, the 8:4 retiming and MUX stage receives data $D_8$<7:0> and based on received clock C8 outputs the data at double the data rate on a one-half reduced number of lines $D_4$<3:0>. Similarly, the 4:2 retiming and MUX stage receives data $D_4$<3:0> and based on received clock C4 outputs the data at double the data rate on a one-half reduced number of lines $D_2$<1:0>. Finally, the 2:1 retiming and MUX stage 250 receives data $D_2<1:0>$ and based on received clock C2 outputs the data at double the data rate on a single data line 251 to output the data D.

Figure 6A:
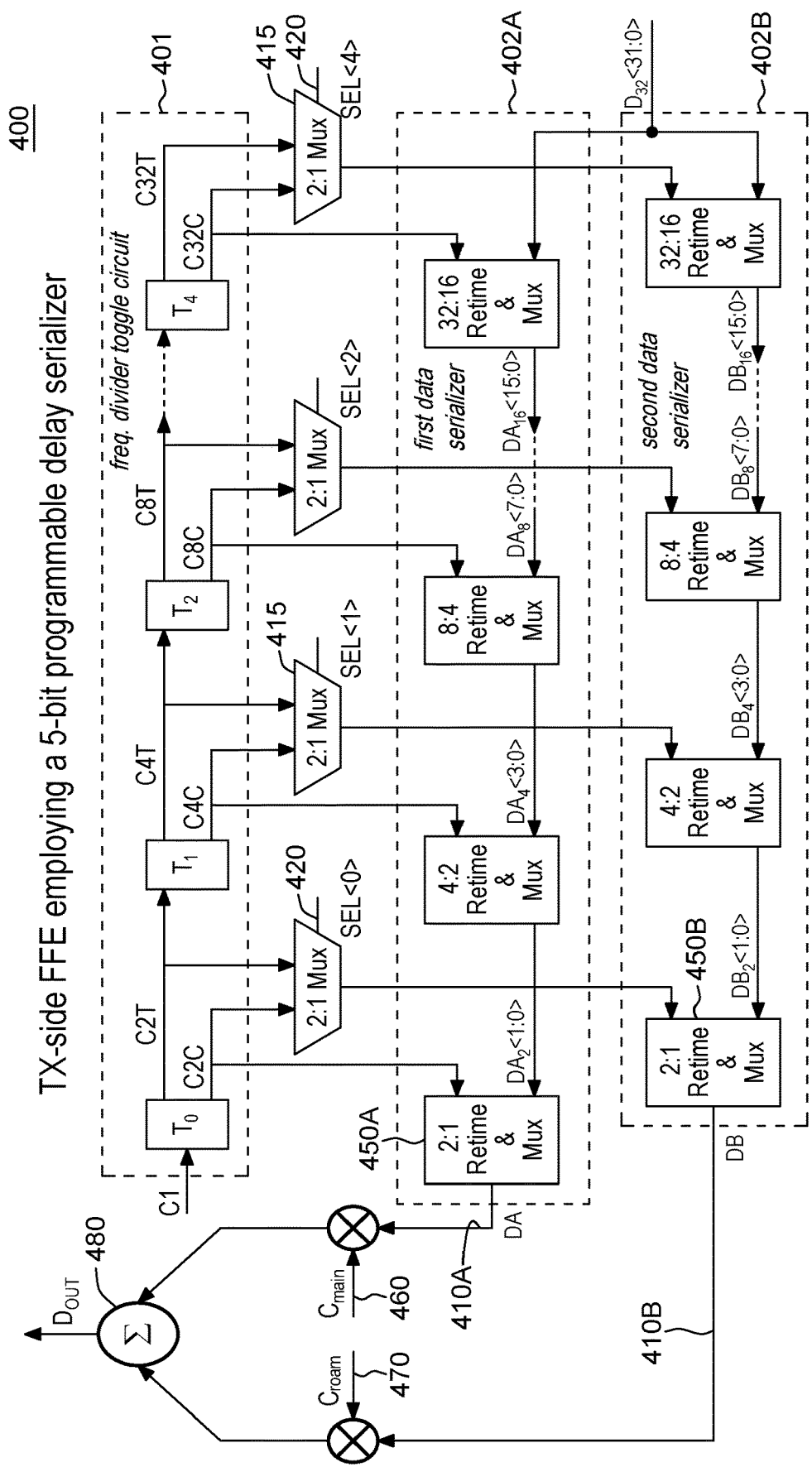
FIG. 6A depicts a circuit block diagram of a TX-side FFE embodiment employing a 5-bit programmable delay serializer in which the relative latency between outputs DA and DB can be varied in 1 UI increments.

By introducing clock phase switching into the structure of the data serializer 200 of FIG. 4, a variable delay can be efficiently implemented in the data path of the TX. FIG. 6A depicts a circuit block diagram of a TX-side FFE 400 employing a 5-bit programmable delay serializer in which the relative latency between outputs DA and DB can be varied in 1 UI increments. As depicted, the representative embodiment of the TX-side FFE 400 of FIG. 6A operates a 5-bit programmable counter (such as shown in FIG. 3) in parallel with the simple 32:1 serializer of FIG. 4. In particular, a top row 401 of successive toggle flip-flops (e.g., toggle circuits $T_p$, where p=0, 1, . . . , 4) generates corresponding successive binary frequency scaled sub-multiple clocks, i.e., C2T, C4T, C8T, C16T and C32T, along with their complements, i.e., binary frequency scaled sub-multiple clocks, C2C, C4C, C8C, C16C and C32C output from respective toggle circuits $T_0, T_1, \ldots, T_4$. For example, from the received clock C1 at a fundamental or full-rate clock frequency, a simple serializer 402A, which is used for the stationary FFE taps such as the main cursor, and includes retiming and MUX stage elements providing output 410A data DA, has fixed clocking for all serializer stages 450A, i.e., clocking from respective binary frequency scaled clocks C2C, C4C, C8C, C16C and C32C. For example, as shown in FIG. 6A, the 32:16 retiming and MUX stage receives fixed clock C32C, the 8:4 retiming and MUX stage receives fixed clock C8C, the 4:2 retiming and MUX stage receives fixed clock C4C, and the 2:1 retiming and MUX stage receives fixed clock C2C.

Further in the TX-side FFE 400, a further 5-bit programmable delay serializer 402B, which is used for a roaming tap of the FFE, and includes retiming and MUX stage elements 450B providing output 410B data DB, is driven by binary frequency scaled clocks whose phases can be switched with five additional 2:1 MUXes 415. Each respective 2:1 MUX 415 receives a binary frequency divided clock and respective complementary binary frequency divided clock output from a respective toggle circuit, e.g., clocks C2T, C2C output from toggle circuit $T_0$, clocks C4T, C4C output from toggle circuit $T_1$, clocks C8T, C8C output from toggle circuit $T_2$, clocks C16T, C16C output from toggle circuit $T_3$ (not shown explicitly in figure), and clocks C32T, C32C output from toggle circuit $T_4$. Each of these clock phases is selected using one bit of a 5-bit control vector SEL<4:0> 420 input to each 2:1 MUX 415.

In an embodiment, when clock phase control vector SEL<4:0> is set to all zeros, then the same clock phases are input to the corresponding retiming and MUX stage elements in the two serializers 402A, 402B, and the respective DA and DB output data streams 410A, 410B are generated on the same clock cycle.

By changing one or more of the clock phase control vector SEL bits to logic one, the DB data stream can be delayed (relative to the DA data stream) by integral multiples of full-rate (C1) clock periods. As an example, if clock phase control vector SEL<4:0> is set to be <00100>, then the DB data stream is delayed four full C1 periods, which corresponds to 4 UIs of delay with respect to DA. With the example 5-bit programmable delay serializer 400 of FIG. 6A, the relative latency introduced between the DA and DB data outputs 410A, 410B is variable from 0 to 31 UI, in increments of 1 UI. Thus, programmable delay serializer 400 of FIG. 6A exemplifies an efficient structure for generating a programmable roaming tap for the TX-side FFE.

As shown in FIG. 6A, the DA data output 410A is associated with the main cursor and is multiplied by an adaptable (main) coefficient 460. The delayed DB data output 410B of the transmit-side FFE is generated to correct for a post-cursor signal at a delay of up to 31 UI and is multiplied by an adaptable (roaming tap) coefficient 470. These weighted data signals are summed by a summation element, e.g., an adder 480, to provide the transmit data output.

Figure 6B:
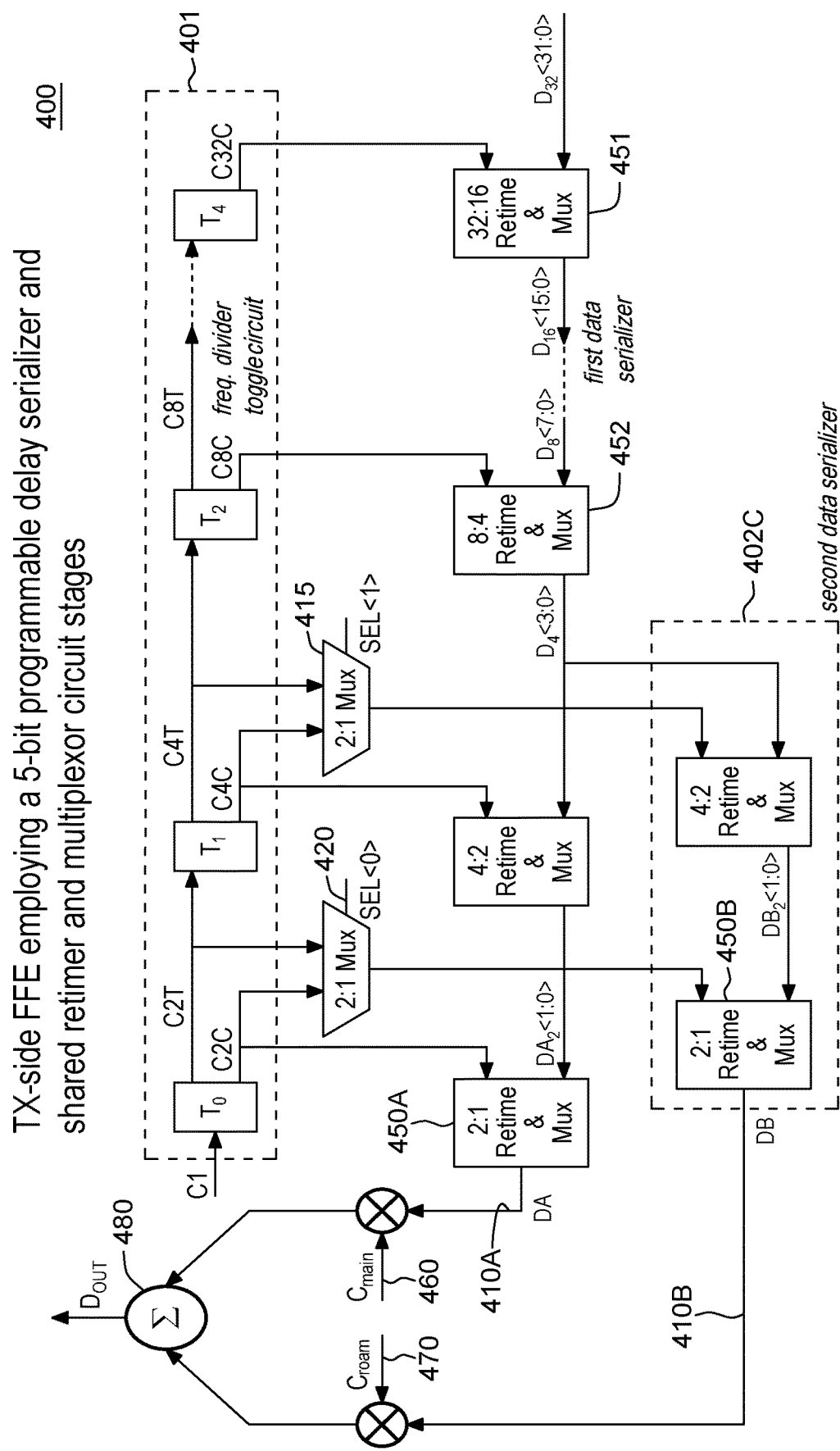
FIG. 6B depicts an alternate embodiment of FIG. 6A showing how one or more of the stages can be shared between the first and second data serializers when the required latency difference between the DA and DB outputs is relatively limited.

FIG. 6B depicts a further embodiment of FIG. 6A where the first and second data serializers share one or more stages when the required latency difference between the DA and DB outputs is relatively limited. Thus, a single rightmost retimer and multiplexor circuit stage 451 is shared between the A and B data paths and receives the input 32 bit parallel data $D_{32}<31:0>$. In this embodiment, the next retimer and multiplexor stage (the 16:8 retimer and multiplexor stage, not explicitly shown in the figure) receives the output retimed and multiplexed data $D_{16}<15:0>$ at double the data rate on one-half reduced number of lines. The next retimer and multiplexor stage 452 (the 8:4 retimer and multiplexor stage) receives the output retimed and multiplexed data $D_8<7:0>$ at a data rate which is another factor of two higher on a number of lines that is reduced by another factor of two. Note that the 16:8 and 8:4 retimer and multiplexor stages are also shared between the A and B data paths. Further in the embodiment depicted in FIG. 6B, the particular 2:1 MUXes 415 selected by the SEL<4>, SEL<3>, and SEL<2> bits are not needed (or would always be set to zero, as only one clock phase C32C, one clock phase C16C (not explicitly shown in the figure), and one clock phase C8C would be used).

In non-limiting embodiments, the slowest (e.g., rightmost) stage(s) that receive the most frequency divided sub-multiple(s) of the input clock signal is(are) shared. Only the two fastest stages 402C (those clocked at a C2 or C4 clock rate) include the 2:1 MUXes 415 for programming the relative latency. If the input clock rate were full-rate (as shown in the embodiment of FIG. 6B), the programmable latency difference between the DA and DB outputs would be 0 UI, 1 UI, 2 UI, or 3 UI (based on the two control bits SEL<0> and SEL<1>) 420.

Figure 7:
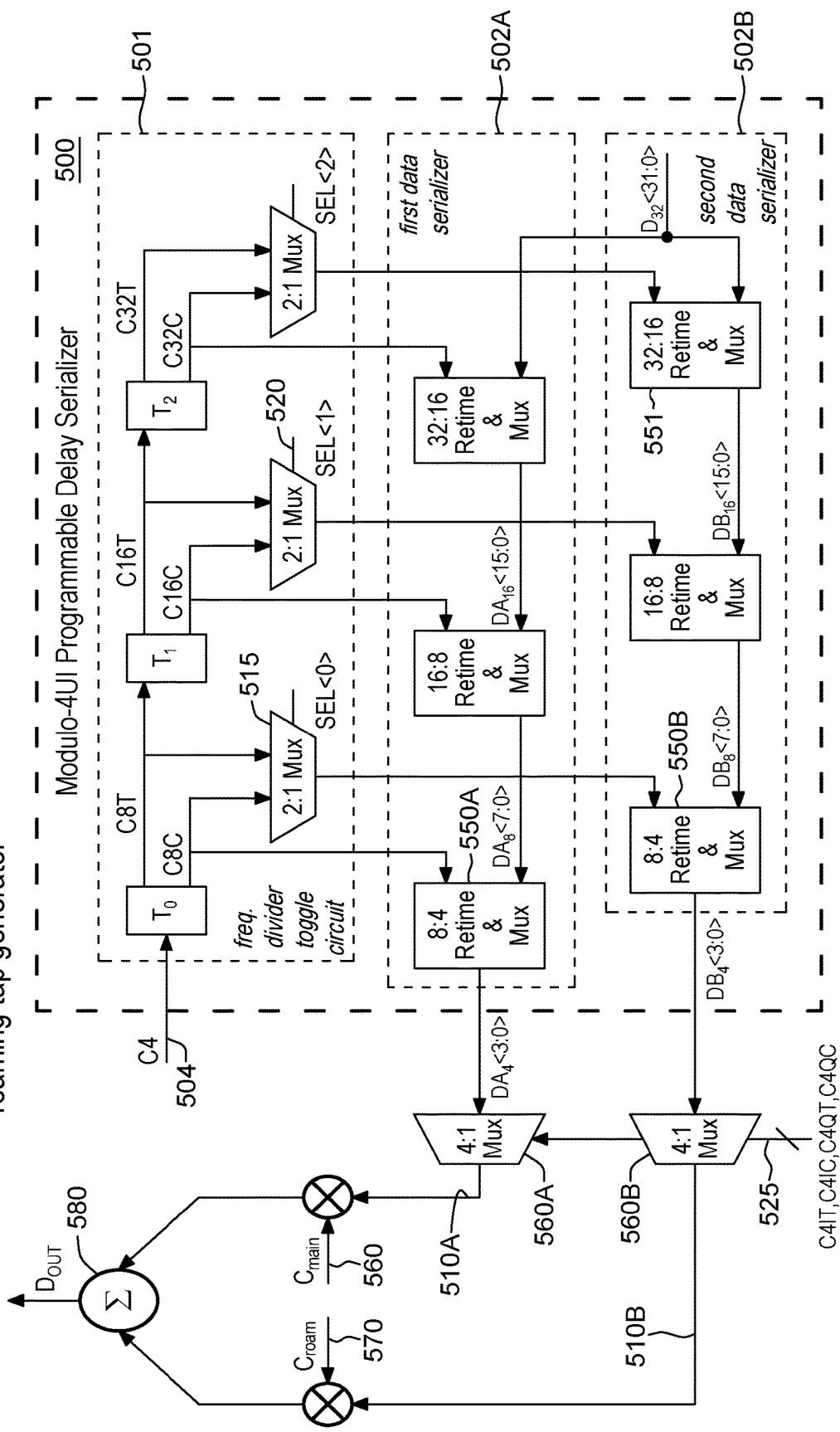
FIG. 7 is a circuit block diagram of a TX-side FFE embodiment employing a programmable roaming tap generator employed in a 3-bit programmable delay serializer with modulo-4 UI relative latency between outputs DA and DB where the TX-side FFE is operated with quarter-rate clocks.

For usage at very high data rates, e.g., 56 Gbaud, an efficient structure for generating a programmable roaming tap for the TX-side FFE is shown in FIG. 7 that is based on quarter-rate clocking.

FIG. 7 is a circuit block diagram of a TX-side FFE 500 with a programmable roaming tap generator employed in a 3-bit programmable delay serializer with modulo-4 UI relative latency between DA data output 510A and DB data output 510B. As illustrated in FIG. 7, the structure of the TX-side FFE is programmed for use with quarter-rate clocks, i.e., compared to the TX-FFE circuit of FIG. 6A, the stages at the C1 and C2 clock rates are eliminated. It is understood that although an embodiment depicted in FIG. 7 shows a modulo-4 implementation, the TX-side FFE 500 is configurable as a modulo-N implementation. In a modulo-N implementation, the clock divider circuitry receives an input clock at a scaled sub-multiple clock rate (sub-rate 1/N, e.g., C2, C4, C8 etc.). In a non-limiting embodiment, for a sub-rate (1/N) input clock rate, N is a power of 2 (e.g., $2^k$ where k is a positive integer). In alternative embodiments, "N" could be an odd number. In general, if the structure of FIG. 7 is clocked with a 1/N-rate ("CN") clock, the relative latency between the DA and DB outputs 510A, 510B can be adjusted in increments of N UI (modulo-N relative latency).

Further, in non-limiting embodiments similar to FIG. 6B, the slowest (e.g., rightmost) stage(s) that receive the most frequency divided sub-multiple(s) of the input clock signal is(are) shared. For example, a single rightmost retimer and multiplexor circuit 551 can be shared between the A and B data paths and receive the input 32 bit parallel data $D_{32}<31:0>$.

As depicted in FIG. 7, the representative embodiment of the TX-side FFE 500 includes a top row 501 of toggle flip-flops (e.g., toggle circuits $T_p$, where p=0, 1, 2) generating respective successive binary frequency scaled sub-multiple clocks, i.e., C8T, C16T, and C32T, along with their complements, i.e., binary frequency scaled sub-multiple clocks, C8C, C16C and C32C output from respective toggle circuits $T_0$, $T_1$, $T_2$. For example, from a received input quarter-rate clock C4 504, a simple serializer 502A, which is used for the stationary FFE taps such as for the main cursor, and includes retiming and MUX stage elements providing output 510A data DA, has fixed sub-rate clocking for all serializer stages 550A, i.e., clocking from respective fixed sub-rate clocks C8C, C16C and C32C. For example, as shown in FIG. 7, the 32:16 retiming and MUX stage receives fixed clock C32C, the 16:8 retiming and MUX stage receives fixed clock C16C, and the 8:4 retiming and MUX stage receives fixed clock C8C.

In FIG. 7, since each MUXing stage 550A, 550B in a respective data path doubles the data rate, the number of parallel data lines is reduced by a factor of two after each stage (from $D_{32}<31:0>$ to $D_{16}<15:0>$, from $D_{16}<15:0>$ to $D_8<7:0>$, etc.). For example, the 32:16 retiming and MUX stages 550A, 550B receive data $D_{32}<31:0>$ and based on received sub-rate clock C32 output the data at double the data rate in half the number of data lines, i.e., a reduced number of lines $D_{16}<15:0>$. Similarly, the 16:8 retiming and MUX stages receive data $D_{16}<15:0>$ and based on received sub-rate clock C16, output the data at double the data rate on a one-half reduced number of lines $D_8<7:0>$. Similarly, the 8:4 retiming and MUX stages receive data $D_8<7:0>$ and based on received sub-rate clock C8 output the data at double the data rate on a one-half reduced number of lines $D_4<3:0>$, i.e., quarter-rate data outputs $DA_4<3:0>$ and $DB_4<3:0>$.

Further in the TX-side FFE 500 a further 3-bit programmable delay serializer 502B, which is used for a roaming tap of the FFE, and includes retiming and MUX stage elements 550B providing output 510B data DB, is driven by binary frequency scaled clocks whose phases can be switched with three additional 2:1 MUXes 515. Each respective 2:1 MUX 515 receives a binary frequency divided clock and respective complementary binary frequency divided clock output from a respective toggle circuit, e.g., clocks C8T, C8C output from toggle circuit $T_0$, clocks C16T, C16C output from toggle circuit $T_1$, and clocks C32T, C32C output from toggle circuit $T_2$. These clock phases are selected using one bit of a 3-bit control vector SEL<2:0> 520 input to each 2:1 MUX 515.

As in the previous embodiment of FIG. 6A, the relative delays between the DA and DB output data streams 510A, 510B is programmed by switching the clock phases of the DB data path via the (3 bit) select signals 520 (SEL<2:0>) of the 2:1 MUXes 515. In the TX-side FFE 500 embodiment of FIG. 7, however, because the clock period is 4 UI, the relative latency introduced between the DA and DB data outputs can be varied from 0 to 28 UI, in increments of 4 UI. The respective quarter-rate outputs $DA_4<3:0>$ and $DB_4<3:0>$ of the modulo-4 UI programmable delay serializer 500 are converted to full-rate outputs by respective 4:1 MUXes 560A, 560B. That is, a clock generator circuit provides each respective 4:1 MUX 560A, 560B with a MUX control bit 525 labeled C4IT, C4IC, C4QT and C4QC which are clock signals that each correspond to a different phase with respect to the received quarter-rate clock C4 to select a particular output from the respective fixed $DA_4<3:0>$ and roaming $DB_4<3:0>$ output signals and provide respective fixed DA output signal and delayed roaming DB output signal at full data rate on respective single data output lines 510A, 510B. That is, using divider circuits (not shown), different C4 clock phases, e.g., in-phase C4IT (corresponding to C4 at input to toggle circuit $T_0$), complementary phase C4IC, quadrature phase C4QT and complementary quadrature phase C4QC, are being used to switch the MUXes, i.e., select which of the four inputs of the MUX 560A (and 560B) are being selected at a given time even though the serial DB output data signal on data output line 510B is delayed at multiples of 4 UI relative to the fixed serial DA output on single data output line 510A.

As shown in FIG. 7, the serial data DA output 510A is associated with the main cursor and is multiplied by an adaptable (main) coefficient 560. The delayed serial data DB output 510B of the transmit-side FFE is generated to correct for a post-cursor signal at a delay of up to 28 UI at multiples of 4 UI and is multiplied by an adaptable (roaming tap) coefficient 570, e.g., depending upon detected signal reflections to be compensated. These weighted data signals are summed by a summation element, e.g., an adder 580, to provide the transmit data output.

While the architecture of FIG. 7 could be used as a roaming tap generator, its delay resolution is limited to 4 UI. However, a roaming tap generator with 1 UI resolution is preferred for accurate reflection compensation. To provide this 1 UI resolution, additional hardware is added to the block diagram of FIG. 7.

Figure 8:
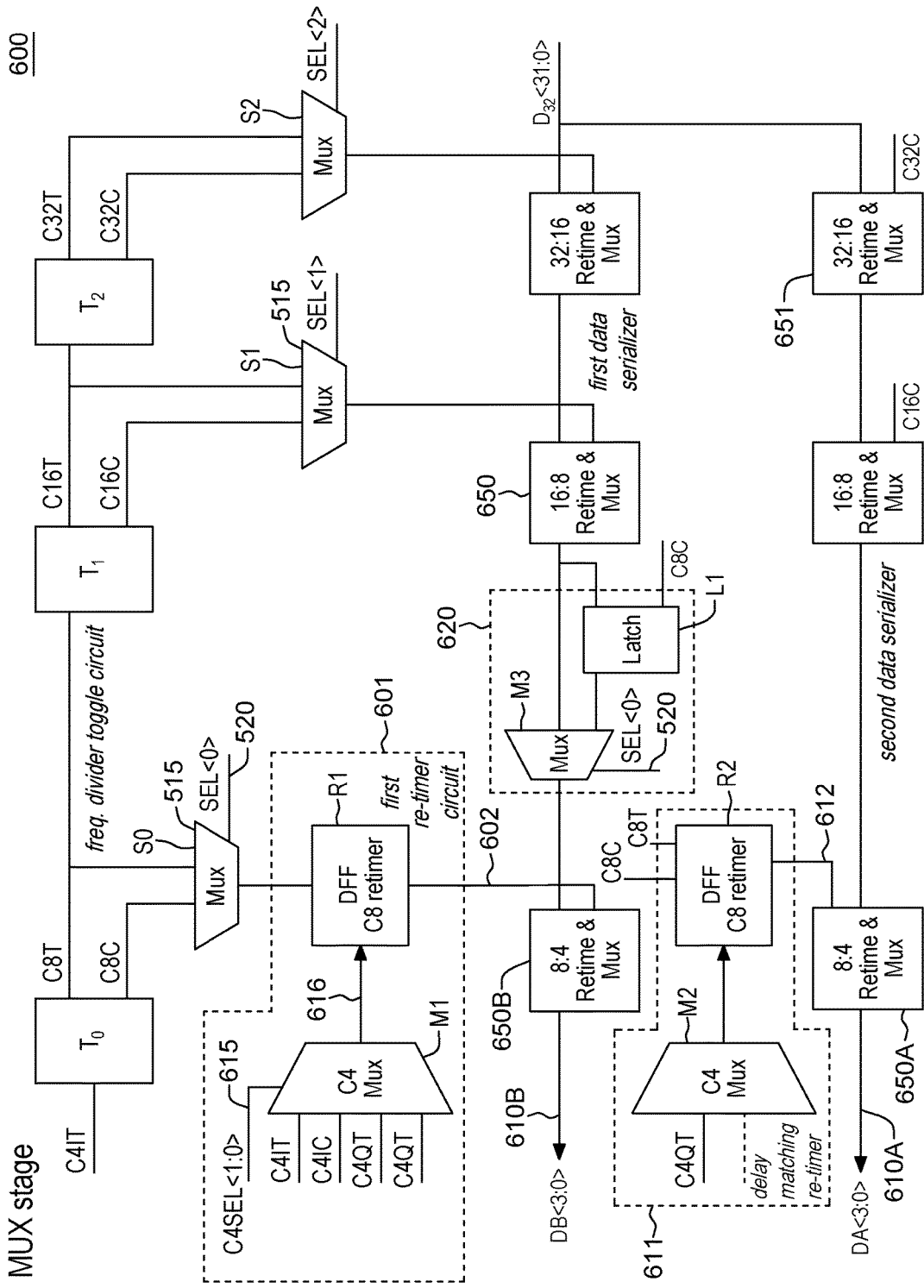
FIG. 8 is a block diagram of an embodiment of a 5-bit programmable delay serializer in which the relative latency between outputs DA and DB can be varied in 1 UI increments and which employs a re-timer to reposition a clock driving the final retiming and MUX stage in 1 UI increments.

FIG. 8 is a block diagram of a 5-bit programmable delay serializer 600 in which the relative latency between serial data outputs DA and DB can be varied in 1 UI increments.

FIG. 8 illustrates a 5-bit programmable delay serializer 600 including additional re-timer circuitry 601, e.g., a latch or D-flip flop C8 retimer (R1), is used to reposition the C8 clock driving the final retiming and MUX stage 650B in 1 UI increments. To do this, the C4 phase which clocks the retimer R1 is switched using MUX M1 between the different C4 clock phases, i.e., in-phase C4IT (corresponding to C4 at input to toggle circuit $T_0$), complementary phase C4IC, quadrature phase C4QT and complementary quadrature phase C4QC. That is, using an M1 MUX input select bit C4SEL<1:0>615, MUX M1 output 616 is programmed to select one of the four C4 clock phase positions, e.g., C4IT, C4IC, C4QT and C4QC, to clock retimer latch R1 that receives and retimes the C8 output of the S0 MUX 515 in order to provide extra delay, e.g., 0 UI, 1 UI, 2 UI, or 3 UI additional delay. Thus, one of four different additional delays at 1 UI resolution is provided at the output 602 of retimer R1 driving the 8:4 retimer/MUX 650B, which produces the DB data output on the output line 610B.

For the purpose of matching the additional insertion delay introduced by M1 and R1 (e.g., latency at the output of 8:4 retimer/MUX 650B due to the additional re-timer circuitry 601), a delay matching re-timer circuit 611 having additional MUX (M2) and a re-timer latch or flip-flop (R2) are configured in the fixed delay path (used for the main cursor) to generate a similar delayed output 612 driving the 8:4 retimer/MUX 650A, so that the 8:4 retimer/MUX 650A produces the DA data output on the output line 610A with a matched propagation delay. MUX M2 is in the fixed delay path so it is hardwired to always select just one of the clock phases (e.g., C4QT and/or its complement). By selecting C4IT, C4IC, C4QT and C4QC with MUX M1, either 0, 1 UI, 2 UI, or 3 UI of additional delay can be added to the DB output (with respect to that of the DA output).

As an example, as MUX M2 of re-timer circuit 611 receives only one clock phase, e.g., C4QT clock, with M2 in the fixed delay path (providing output DA<3:0>), then selecting C4IC with M1 using C4 clock phase selection input bit C4SEL<1:0>615 for the variable delay path will result in one additional UI of delay for output DB<3:0>. This additional delay is added to the relative latency specified with SEL<2:0> bits of the 2:1 MUXes 515.

Further, in non-limiting embodiments similar to FIG. 6B, the slowest (e.g., rightmost) stage(s) that receive the most frequency divided sub-multiple(s) of the input clock signal is(are) shared. For example, a single rightmost retimer and multiplexor circuit 651 can be shared between the A and B data paths and receive the input 32 bit parallel data $D_{32}$<31:0>.

FIG. 9 depicts a table 700 showing all of the selection code to variable delay path relationships, and particularly illustrating how the delay can be programmed from 0 to 31 UI, in increments of 1 UI. The table 700 includes a column 702 depicting the coarse programmable delay selection for switching the clock phases of the DB data path by programming the 2:1 MUXes 515 using the SEL<2:0> (3-bit) select signals 520. Further, column 705 shows the additional C4SEL<1:0> (2-bit) select signals 615 for choosing which C4 clock phase, e.g., C4IT, C4IC, C4QT and C4QC is to be selected with MUX M1 for clocking retimer R1 in the variable delay path, so that output DB<3:0> on path 610B will be produced with an additional delay of 0 UI, 1 UI, 2 UI or 3 UI. The table 700 includes a column 710 depicting the resulting data path latency, 0 UI-31 UI in 1 UI increments given a coarse programmable delay selection using the SEL<2:0> (3-bit) select signals 520 and the additional C4SEL<1:0> (2-bit) select signals 615. For example, the relative introduced delays 720 ranging between 0 UI and 3 UI that are capable of being introduced at output data path 610B for post-cursors relative to main cursor output path 610A as shown in table 700 result from a programmed SEL<000> input and respective corresponding additional programmable C4 phase C4SEL inputs <00>, <01>, <10> and <11>. Further, the relative introduced delays 730 ranging between 4 UI and 7 UI that are capable of being introduced at output data path 610B for post-cursors relative to main cursor output path 610A as shown in table 700 result from a programmed SEL<001> input and respective corresponding additional programmable C4 phase C4SEL inputs <00>, <01>, <10> and <11>. The scheme depicted in table 700 of FIG. 9 repeats for the FFE circuit embodiment depicted in FIG. 8, where a final programmable relative introduced delay 790 ranging between 28 UI and 31 UI that are capable of being introduced at output data path 610B for post-cursors relative to main cursor output path 610A as shown in table 700 result from a programmed SEL<111> input and respective corresponding additional programmable C4 phase C4SEL inputs <00>, <01>, <10> and <11>. Thus, as another example, assuming that MUX M1 of re-timer circuit 601 receives a C4SEL <01> to select C4IC and the SEL<2:0> is set to <001>, then the total difference in delays 712 introduced between the DA and DB data paths will equal 5 UI.

As further shown in FFE serializer circuit 600 of FIG. 8, there is provided in-line with the output of the 16:8 retimer/MUX element 650, further circuitry 620 including a MUX M3 that receives a further output of the 16:8 retimer/MUX element 650 delayed by a latch L1 and is used to select either the normal 16:8 retimer/MUX output or the 16:8 retimer/MUX output delayed by a delay time provided by latch L1. That is, circuitry 620 is provided and used to avoid timing problems as a result of the C8 clock 602 being output (retimed) from latch R1 at a different time according to the programmed selection of the C4 clock phase by MUX M1. For example, without circuitry 620, the output of the 16:8 retimer/MUX element 650 can arrive too early to meet the setup/hold times of the 8:4 retimer/MUX 650B driven by retimed input clock 602, given the different time positions selected by MUX M1 over the 0 UI-3 UI latency range; the resulting data hold timing violation can result in undesirable bit errors. The latch labeled as L1 in circuit 620 receives the C8 clock (phase C8C) and inserts a delay of the 16:8 retimer/MUX output data that is switched into the data path to solve the data hold timing problem whenever SEL<0> bit 520 is set to logic high. That is, a compensating data delay is provided in the delayed data DB path at the output of the 16:8 retimer/MUX by using MUX M3 to select the output of latch L1 whenever select bit SEL<0> bit 520 is set to logic high. Thus, valid data timing is preserved at the input to the 8:4 retimer/MUX 650B as it receives a delayed version of the 16:8 retimer/MUX output via latch L1. As a further timing delay optimization, rather than receiving only clock phase C8C at latch L1, the latch L1 can be optionally configured to receive a different delay clock (phase) input depending upon the selected 0 UI-3 UI latency specified by C4SEL<1:0>.

To achieve even better performance and avoid timing challenges by using very short UIs at very high data rates (e.g., at symbol rates of 32 Gbaud or higher), the design of FIG. 8 is modified so that the delays of the different clock paths are matched and/or adjusted to obtain a desired performance.

Figure 10:
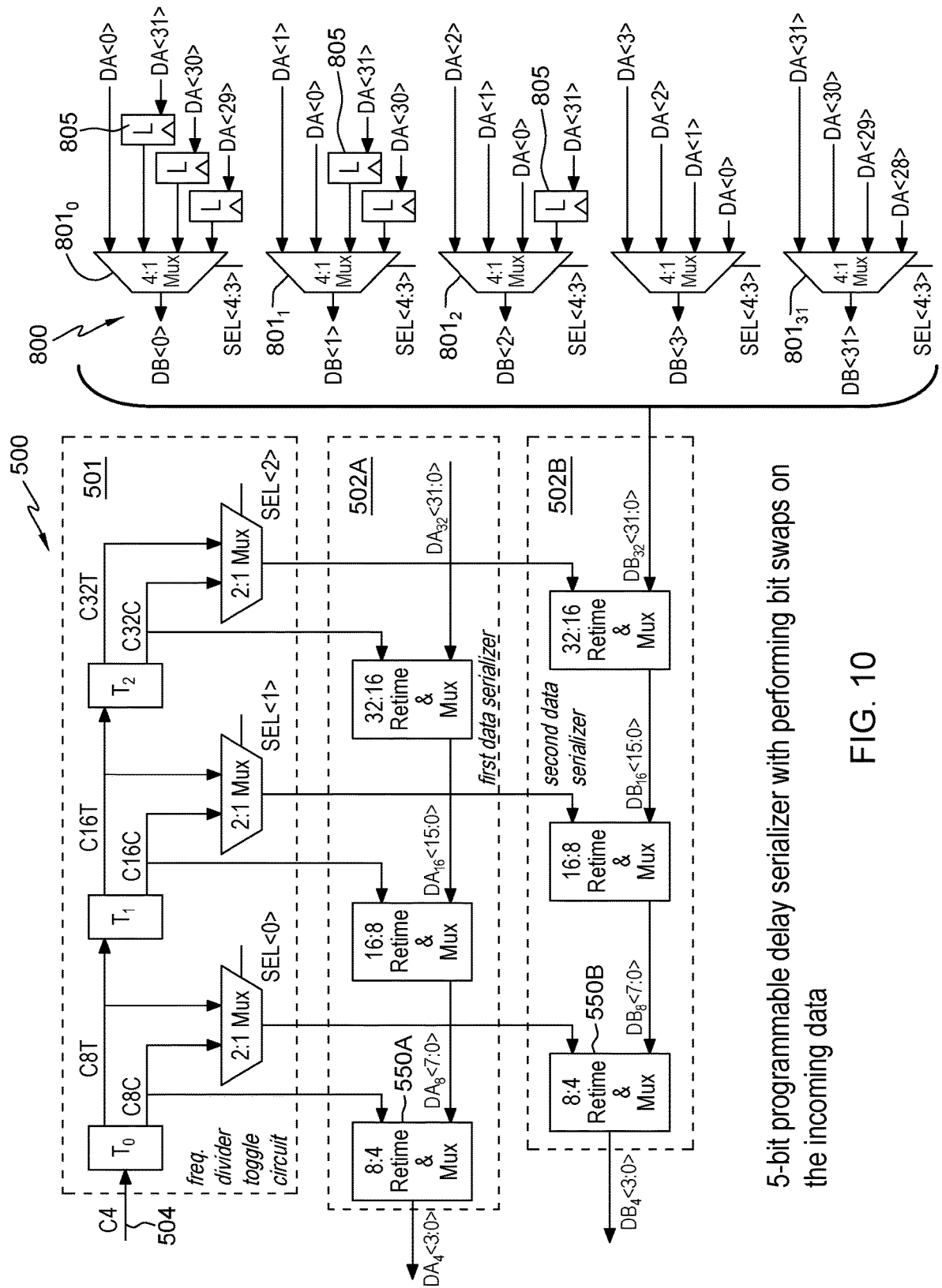
FIG. 10 shows an alternative embodiment for adding 1 UI delay resolution to the TX-side FFE circuit embodiment of FIG. 7 that employs a 5-bit programmable delay serializer by performing bit swaps on the incoming data with multiple 4:1 MUXes.

FIG. 10 shows an alternative way of adding 1 UI delay resolution to the circuit of FIG. 7 which avoids any timing challenges. In particular, FIG. 10 depicts a further embodiment of a 5-bit programmable delay serializer in which the relative latency between outputs DA and DB can be varied in 1 UI increments. In this case, the 1 UI resolution is implemented by performing bit swaps (or mappings) on the incoming data 800, i.e., by changing data bit patterns at the input to the original modulo-4 serializer, using multiple 4:1 MUXes. Since these input data bits are provided to the serializer at a slow (C32) speed, the propagation delays of the 4:1 MUXes are not significant, and the timing margins in this part of the serializer are large. Here the 1 UI shift is introduced by redefining the 32-bit words being input in parallel.

For example, to introduce a 0 UI shift, each of the bits of the 32-bit data input to the DB data input path will map to each respective corresponding bit of the 32-bit data input to the DA data input path. That is, by selecting first inputs of each respective 4:1 MUX $801_0$, $801_1$, $801_2$, ..., $801_{31}$, the input mapping is as follows: DB<0>=DA<0>, DB<1>=DA<1>, DB<2>=DA<2>, ..., DB<31>=DA<31> by appropriate selection of the respective DA inputs DA<0>, DA<1>, ..., DA<31> at respective 4:1 MUXes $801_0$, $801_1$, $801_2$, ..., $801_{31}$. Each MUX $801_0$, ..., $801_{31}$ is selectable using SEL<4:3> bits to select one input at a time. The 4:1 MUXes are used to modify the mapping of the incoming data DA<31:0> to the data DB<31:0>. If all of the 4:1 MUXes (controlled with bits SEL<4:3>) select their topmost inputs, data vectors DB<31:0> and DA<31:0> match, and no extra delay is added to output DB<3:0>. However, to introduce 1 UI of delay at the DB data input path relative to the DA input data path, all of the 4:1 MUXes $801_0$, $801_1$, $801_2, \ldots, 801_{31}$ select their second (from the top) inputs, e.g., DA<0> is mapped to DB<1>, DA<1> is mapped to DB<2>, DA<2> is mapped to DB<3>, and so on, and DA<30> is mapped to DB<31> which corresponds to a 1 UI delay of the input data. In this case, to map an input to the DB>0> input, a latch 805 that is clocked by a sub-rate C32 clock is used to produce a delayed version of DA<31>. In this embodiment, processing DA<31> through a latch delays it by 32 UI (since the latch 805 is clocked by a C32 clock). However, for the serializer 502B, the DB<0> input has a latency that is 31 UI smaller than that of the DB<31> input, so the net extra delay for DA<31> equals 32 UI-31 UI=1 UI. Note that without latch 805, routing DA<31> to DB<0> would have advanced DA<31> by 31 UI. The latch 805 that is clocked by a C32 clock is needed so as to delay it by 32 UI so that the net delay of DA<31> is 1 UI (as desired). In embodiments, each delay latch 805 at the multiplexors shown in FIG. 10 is clocked by the C32T or C32C frequency divided clock.

Similarly, to introduce 2 UI of delay at the DB data input path relative to the DA input data path, all of the 4:1 MUXes $801_0, 801_1, 801_2, \ldots, 801_{31}$ are programmed to select their third (from the top) inputs, e.g., DA<0> is mapped to DB<2>, DA<1> is mapped to DB<3>, DA<2> is mapped to DB<4>, and so on, and DA<29> is mapped to DB<31> which corresponds to a 2 UI delay of the input data. In this case, to map an input to the DB<0> input, a latch 805 that is clocked by the sub-rate C32 clock is used to produce a delayed version of DA<30>. As mapping DA<30> to the DB<0> input advances the data bit by 30 UI, the delay of the latch clocked by a C32 clock is needed so as to delay it by a net delay equal to 2 UI (i.e., 32 UI-30 UI). In a similar manner, when DA<31> is mapped to DB<1> at the third input of MUX $801_1$, a receiving latch 805 that is clocked by the sub-rate C32 clock is used to produce a delayed version of DA<31>.

In a similar manner, selecting the fourth inputs of the 4:1 MUXes $801_0, 801_1, 801_2, \ldots, 801_{31}$ achieves a mapping that corresponds to delaying the input data by 3 UI. For example, to introduce 3 UI of delay at the DB data input path relative to the DA input data path, all of the 4:1 MUXes $801_0, 801_1, 801_2, \ldots, 801_{31}$ select their fourth (from the top) inputs, e.g., DA<0> is mapped to DB<3>, \ldots, DA<28> is mapped to DB<31> which corresponds to a 3 UI delay of the input data. In this case, to map an input to the DB<0> input, a latch 805 that is clocked by the sub-rate C32 clock is used to produce a delayed version of DA<29>. This is because mapping DA<29> to the DB<0> input advances the data bit by 29 UI, and the delay of the latch clocked by a C32 clock is needed so as to delay it by a net delay equal to 3 UI (i.e., 32 UI-29 UI). Similarly, to map an input to the DB<1> input, a latch 805 is used to produce a delayed version of DA<30> given its 29 UI advance (due to bit mapping or swapping), and to map an input to the DB<2> input, a latch 805 that is clocked by the sub-rate C32 clock is used to produce a delayed version of DA<31> given its 29 UI advance (due to bit mapping or swapping).

This delay of 0, 1 UI, 2 UI, or 3 UI is added to the example modulo-4 UI relative latency specified with the SEL<2:0> bits. The embodiment of a 5-bit programmable delay serializer in which the relative latency between outputs DA and DB can be varied in 1 UI increments using the scheme as shown in FIG. 10 by performing bit swaps (or mappings) on the incoming data, i.e., by changing data bit patterns at the input to the second DB data path, is applicable to any modulo-N serializer, using multiple N:1 MUXes as controlled by a number of selection SEL bits (with the number dependent on the value of N).

Figure 11:
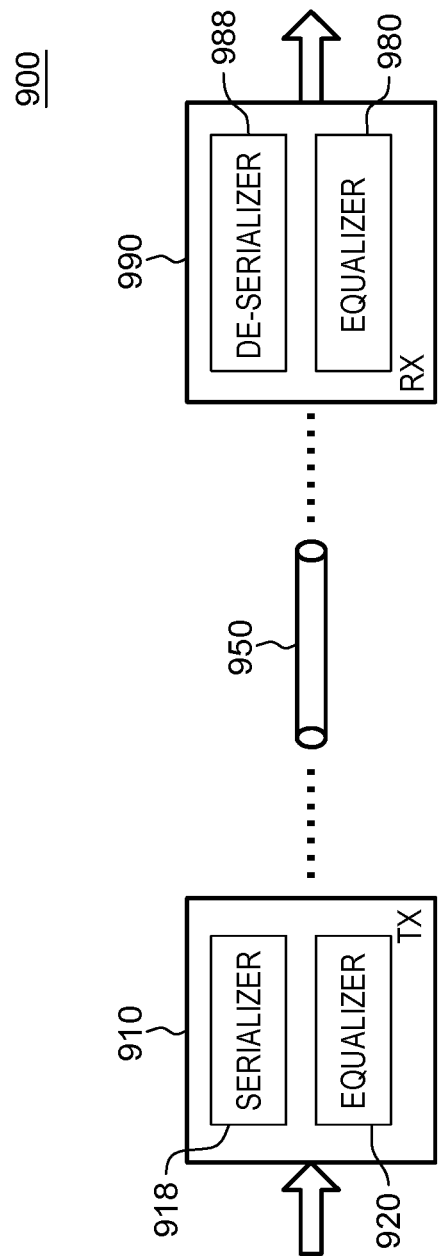
FIG. 11 depicts a Serializer/Deserializer (SerDes) system employing the TX-side FFE according to embodiments of the present invention.

The improved transmit-side feedforward equalizer (FFE) employing a programmable roaming tap generator integrated into the data serializer according to each of the embodiments depicted in FIGS. 6A, 6B, 7, 8 and 10 can be employed in a high speed digital integrated circuit (IC) for use in a Serializer/Deserializer (SerDes) system such as the SerDes system 900 shown in FIG. 11.

As shown in FIG. 11, a typical SerDes system contains a physical link layer including both the transmitter (TX) 910 and a receiver (RX) 990 communicating over a conductive channel 950. The transmitter (TX) 910 is shown including a TX-side serializer 918 that receives parallel input data and provides a serial data bit stream for transmission over the channel 950 at multi-Gbit/sec transmission rates. The transmitter 910 includes a data equalizer (EQ) 920. Similarly, the receiver (RX) 990 is shown including an RX-side deserializer 988 that receives the transmitted serial data from the channel and provides parallel data output. The receiver 990 can further include signal processing with a receive-side equalizer 980 and clock and data recovery.

The channel 950 between the transmitter backend and receiver front end consists of transmission lines (TL) that include wiring and printed circuit board traces.

The SerDes system channel 950 is a linear system having a channel characteristic that exhibits irregularities causing signal reflections and high frequency attenuation of the transmitted signal including high frequency signal amplitude and phase distortion. The high frequency signal amplitude and phase distortion causes the intersymbol interference. When data bits are overlayed upon each other a formed "eye diagram" will appear with a closed eye. An "eye diagram" represents eye characteristics, or parameters representative of eye characteristics, that are derived from the communication channel's operating characteristics. Eye characteristics include the eye opening, pulse shape (symmetry), pre-emphasis of the data on the channel, relating to amplification and equalization of the transmitted signal, and signal drive strength, e.g., relating to slew rate. An eye diagram can be used to evaluate the quality of the received data signals (before or after equalization).

In embodiments of the invention, the transmitted data needs to be reconstructed (equalized) for the received data to become usable.

Thus, as shown in FIG. 11, while equalization is typically implemented in both the transmitter and in the receiver, before the channel 950, the transmitted high frequency content is peaked at the transmit side so as not to impact the receiver input signal to noise ratio. Therefore, in the transmitter 910, the FFE equalization according to aspects of the invention is implemented to provide pre-emphasis of the high frequency leading edge of bit transitions and particularly, the compensation of reflections. In the receiver, additional equalization is implemented to restore the combined transmitter and channel characteristic towards a reference channel that has no or reduced intersymbol interference.

In embodiments, a computer or processing system may implement/employ any portion of SerDes system 900. A computer system is only one example of a suitable processing system and is not intended to suggest any limitation as to the scope of use or functionality of embodiments of the system and methodologies described herein. The processing system shown may be operational with numerous other general purpose or special purpose computing system environments or configurations. Examples of well-known computing systems, environments, and/or configurations that may be suitable for use with the processing system may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of a computer system may include, but are not limited to, one or more processors or processing units, a system memory, and a bus that couples various system components including system memory to processor. The processor may include a software module that performs methods to evaluate or monitor eye diagrams and determine main tap and roaming tap coefficient values as described herein. The module may be programmed into the integrated circuits of the processor, or loaded from memory, a storage device, or a network or combinations thereof.

Bus may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory can include computer system readable media in the form of volatile memory, such as random access memory (RAM) and/or cache memory or others. Computer system may further include other removable/non-removable, volatile/non-volatile computer system storage media. By way of example only, a storage system can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to a bus by one or more data media interfaces.

Computer system may also communicate with one or more external devices such as a keyboard, a pointing device, a display, etc.; one or more devices that enable a user to interact with computer system; and/or any devices (e.g., network card, modem, etc.) that enable computer system to communicate with one or more other computing devices. Such communication can occur via Input/Output (I/O) interfaces.

Still yet, computer system can communicate with one or more networks such as a local area network (LAN), a general wide area network (WAN), and/or a public network (e.g., the Internet) via a network adapter. As depicted, network adapter communicates with the other components of computer system via bus. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claim.

What is claimed is:

1. A transmit-side feedforward equalizer comprising:
   a first data serializer circuit comprising a first plurality of pipeline connected re-timer and multiplexor circuit stages operable for serializing input digital data bits received in parallel at a first re-timer and multiplexor circuit stage, each successive re-timer and multiplexor stage of said first plurality operable to reduce the number of parallel digital bits output at each respective successive stage in accordance with a respective received different binary frequency scaled clock signal, the respective received different binary frequency scaled clock signal being a scaled sub-multiple of an input clock signal;
   a second data serializer circuit operating in parallel with said first data serializer circuit and comprising a second plurality of pipeline connected re-timer and multiplexor circuit stages in one-to-one correspondence with said first plurality of pipeline connected re-timer and multiplexor circuit stages, said second data serializer circuit operable for serializing the input digital data bits received in parallel at a first re-timer and multiplexor circuit stage, said second data serializer providing a second data output delayed in time according to a programmed latency with respect to an output of said first data serializer circuit; and
   a plurality of programmable switching devices in one-to-one correspondence with said second plurality of pipeline connected re-timer and multiplexor stages, each respective programmable switching device receiving a respective different binary frequency scaled sub-multiple clock signal or its complement binary frequency scaled sub-multiple clock signal, said plurality of programmable switching devices being programmed to select an output of one of: a binary frequency scaled sub-multiple clock signal or its complement binary frequency scaled sub-multiple clock signal for receipt at its corresponding re-timer and multiplexor stage of said second plurality to program the time delay of said second data serializer circuit output.

2. The transmit-side feedforward equalizer of claim 1, wherein the programmed latency of said second data serializer output relative to said first data serializer output is k unit intervals, a unit interval corresponding to a duration of time of a pulse or symbol in an output data stream, where k is a whole number.

3. The transmit-side feedforward equalizer of claim 2, wherein the input clock signal is a full rate clock signal.

4. The transmit-side feedforward equalizer of claim 2, wherein the input clock signal is a sub-rate clock signal, said transmit-side feedforward equalizer configured for modulo-N relative latency wherein the input clock is 1/N rate of a full rate clock signal, where N is a positive integer, and the programmed latency of said second data serializer circuit output relative to the first data serializer circuit output is k=jN UI where j is a whole number.

5. The transmit-side feedforward equalizer of claim 3, further comprising:
   a weighting circuit adapted for applying a first weight to the first data serializer output representing a digital data symbol communicated over a communications channel;
   a weighting circuit adapted for applying a second weight to the second data serializer output representing a digital data symbol communicated over the communications channel; and
   a summation circuit for combining said weighted first data serializer output and weighted second data serializer output for communication over the communications channel.

6. The transmit-side feedforward equalizer of claim 1, further comprising:
   a plurality of serial connected frequency divider toggle circuits in one-to-one correspondence with said plurality of programmable switching devices, a first toggle circuit receiving the input clock signal, and each successive toggle circuit receiving a frequency divided clock input from an immediate prior toggle circuit, each said successive toggle circuit frequency dividing a received input clock signal by a factor of two to provide a respective said binary frequency scaled clock signal and corresponding complement binary frequency scaled clock signal for input to a corresponding programmable switching device.

7. The transmit-side feedforward equalizer of claim 1, wherein each said plurality of programmable switching devices comprises a 2:1 multiplexor circuit, the 2:1 multiplexor circuit operable to receive a single digital bit signal for selecting said one of: a binary frequency scaled clock signal or its respective complement binary frequency scaled clock signal.

8. The transmit-side feedforward equalizer of claim 1, wherein one or more of said first plurality of pipeline connected re-timer and multiplexor circuit stages and a corresponding one or more of said second plurality of pipeline connected re-timer and multiplexor circuit stages are shared when no latency difference is required between the parallel digital bits output at the respective shared re-timer and multiplexor circuit stages of the first plurality and second plurality, the shared one or more of said re-timer and multiplexor circuit stages corresponding to stages clocked at corresponding one or more lowest frequencies.

9. The transmit-side feedforward equalizer of claim 4, further comprising:
   a first N:1 multiplexor circuit for receiving a reduced N-bit parallel data output of a final retiming and multiplexor circuit stage of said first data serializer circuit timed according to said 1/N sub-rate input clock; and
   a second N:1 multiplexor circuit for receiving a reduced N-bit parallel data output received from a final retiming and multiplexor circuit stage of said second data serializer circuit timed according to said 1/N rate input clock at the programmed latency;
   each said first N:1 multiplexor circuit and second N:1 multiplexor circuit operable to receive multiple phases of said 1/N sub-rate clock signal for serializing said N-bit parallel data output at a full clock rate.

10. The transmit-side feedforward equalizer of claim 9, further comprising:
    a plurality of serial connected frequency divider toggle circuits in one-to-one correspondence with said plurality of programmable switching devices, a first toggle circuit receiving said 1/N rate input clock signal, and each successive toggle circuit receiving a frequency divided clock input from an immediate prior toggle circuit, each said successive toggle circuit frequency dividing a received input clock signal by a factor of two to provide a respective said binary frequency scaled sub-multiple clock signal and corresponding complement binary frequency scaled sub-multiple clock signal for input to a corresponding programmable switching device.

11. The transmit-side feedforward equalizer of claim 10, further comprising:
    a first re-timer circuit for receiving from an output of said first toggle circuit one of: a first binarily frequency divided sub-multiple (½N) clock signal of said 1/N sub-rate input clock signal or a complement of said first binarily frequency divided sub-multiple (½N) clock signal of said 1/N sub-rate input clock signal, and repositioning the first binarily frequency divided sub-multiple clock signal for receipt at a final retiming and multiplexor circuit stage of said second data serializer circuit; and
    a first further multiplexor programmable to select a particular phase of said input 1/N sub-rate clock signal, said particular phase of said 1/N sub-rate input clock signal corresponding to one of N different phases relative to said 1/N sub-rate input clock signal, said first further multiplexor outputting a selected phase of said 1/N sub-rate input clock signal for programming additional latency of said second data serializer circuit output in 0 unit intervals, 1 unit interval, 2 unit intervals, up to N−1 unit intervals relative to said output of said first data serializer circuit.

12. The transmit-side feedforward equalizer of claim 11, further comprising:
    a delay matching second re-timer circuit for receiving from said first toggle circuit said first binarily frequency divided sub-multiple (½N) clock signal of said 1/N sub-rate input clock signal and repositioning the first binarily frequency divided sub-multiple clock signal of said 1/N sub-rate input clock signal for receipt at a final retiming and multiplexor circuit stage of said first data serializer circuit,
    the delay matching second re-timer circuit operable to receive a dedicated 1/N sub-rate input clock signal of a predetermined phase relative to said 1/N sub-rate input clock signal.

13. The transmit-side feedforward equalizer of claim 11, further comprising:
    a latch circuit receiving an output of a pipeline connected retime and multiplexor circuit stage prior to the final retiming and multiplexor circuit stage of said second data serializer circuit for delaying an output of the prior retime and multiplexor circuit stage; and a multiplexor circuit stage for selecting one of: said output of the prior pipeline connected retime and multiplexor circuit stage, or said delayed output of the prior retime and multiplexor circuit stage output from said latch circuit, said multiplexor circuit selecting said delayed output of the prior retime and multiplexor circuit stage output from said latch circuit to prevent a data setup or hold timing problem when a 2:1 multiplexor circuit operable to receive a single digital bit signal is selected for programming a time delay of said second data serializer circuit output using the final retiming and multiplexor circuit stage of said second data serializer circuit or in response to switching a particular phase of said 1/N sub-rate input clock signal to said first further multiplexor of said first retimer circuit.

14. The transmit-side feedforward equalizer of claim 9, further comprising:

a plurality of multiplexor devices, a respective multiplexor device of said plurality associated with a corresponding respective bit position of said input digital data bits received in parallel at said second data serializer circuit, each respective said multiplexor device of said plurality modifying a mapping of input digital data bits received in parallel at the first data serializer circuit to the parallel input data bits at the second data serializer circuit to add an additional time delay latency of 0 unit intervals, 1 unit interval, 2 unit intervals up to N−1 unit intervals at an output of said second data serializer circuit.

15. The transmit-side feedforward equalizer of claim 14, wherein a first input at each said respective multiplexor device associated with said second data serializer circuit receives the same data bit at an identical bit position of said input digital data bits received in parallel at said first data serializer circuit, each said multiplexor device programmed to select each mapped data bit at said first input directly when an additional time delay latency of 0 unit intervals is added.

16. The transmit-side feedforward equalizer of claim 15, further comprising, associated with said first multiplexor device:

a first latch circuit receiving a last bit of said input parallel digital bits when each said multiplexor device is programmed to select a mapped data bit to provide an additional time delay latency of 1 unit interval, and a second latch circuit receiving a second to last bit of said input parallel digital bits when each said multiplexor device is programmed to select a mapped data bit to provide an additional time latency of 2 unit intervals, and a third latch circuit receiving a third to last bit of said input parallel digital bits when each said multiplexor device is programmed to select a mapped data bit to add an additional time latency of 3 unit intervals.

17. A method of operating a transmit-side feedforward equalizer, said method comprising:

serializing input digital data bits received in parallel at a first re-timer and multiplexor circuit stage of a first data serializer circuit comprising a first plurality of pipeline connected re-timer and multiplexor circuit stages, each successive re-timer and multiplexor stage of said first plurality reducing the number of parallel digital bits output at each respective successive stage in accordance with a respective received different binary frequency scaled clock signal, the respective received different binary frequency scaled clock signal being a scaled sub-multiple of an input clock signal;

serializing the input digital data bits received in parallel at a first re-timer and multiplexor circuit stage of a second data serializer circuit in parallel with said first data serializer circuit, the second data serializer circuit comprising a second plurality of pipeline connected re-timer and multiplexor circuit stages in one-to-one correspondence with said first plurality of pipeline connected re-timer and multiplexor circuit stages, said second data serializer providing a second data output delayed in time according to a programmed latency with respect to an output of said first data serializer circuit; and programming a time delay latency of said second data output of said second data serializer circuit using a plurality of programmable switching devices in one-to-one correspondence with said second plurality of pipeline connected re-timer and multiplexor stages, each respective programmable switching device receiving a respective different binary frequency scaled clock signal or its complement binary frequency scaled clock signal, each of said plurality of programmable switching devices programmed to select an output of one of: a binary frequency scaled clock signal or its complement binary frequency scaled clock signal for receipt at its corresponding re-timer and multiplexor stage of said second plurality, wherein the programmed time delay latency of said second data serializer circuit output relative to said first data serializer circuit output is one of: k unit intervals when the input clock signal is a full rate clock signal, or k=jN when the input clock signal is 1/N rate of the full rate clock signal, a unit interval corresponding to a duration of time of a pulse or symbol in an output data stream, and where k, j are whole numbers and N is a positive integer.

18. The method of claim 17, further comprising:

receiving, at a first re-timer circuit, one of: a first binarily frequency divided sub-multiple (½N) clock signal of said 1/N sub-rate input clock signal or a complement of said first binarily frequency divided sub-multiple (½N) clock signal of said 1/N sub-rate input clock signal, and repositioning the first binarily frequency divided sub-multiple clock signal for receipt at a final retiming and multiplexor circuit stage of said second data serializer circuit; and operating a first multiplexor operable to select a particular phase of said input 1/N sub-rate clock signal received at said first re-timer circuit, said particular phase of said input 1/N sub-rate clock signal corresponding to one of N different phases relative to said 1/N sub-rate clock input signal, wherein a selected phase of said input 1/N sub-rate clock signal programs additional latency of said second data serializer circuit output in 0 unit intervals, 1 unit interval, 2 unit intervals or up to N−1 unit intervals relative to said output of said first data serializer circuit.

19. The method of claim 17, further comprising:

mapping the input digital data bits received in parallel at the first data serializer circuit to the parallel input data bits at the second data serializer circuit to add an additional time delay latency of 0 unit intervals, 1 unit interval, 2 unit intervals or up to N−1 unit intervals at an output of said second data serializer circuit, said mapping using a plurality of multiplexor devices, wherein a respective multiplexor device of said plurality is associated with a corresponding respective bit position of said input digital data bits received in parallel at said second data serializer circuit.

20. The method of claim 17, further comprising:

sharing one or more of said first plurality of pipeline connected re-timer and multiplexor circuit stages and a corresponding one or more of said second plurality of pipeline connected re-timer and multiplexor circuit stages when no latency difference is required between the parallel digital bits output at the respective shared re-timer and multiplexor circuit stages of the first plurality and second plurality, the shared one or more of said re-timer and multiplexor circuit stages corresponding to stages clocked at corresponding one or more lowest frequencies.

* * * * *